(12) United States Patent
Cai et al.

(10) Patent No.: US 9,717,112 B2
(45) Date of Patent: Jul. 25, 2017

(54) METHOD AND APPARATUS FOR SMALL CELL CONFIGURATION IN A HETEROGENEOUS NETWORK ARCHITECTURE

(71) Applicant: BlackBerry Limited, Waterloo (CA)

(72) Inventors: Zhijun Cai, Euless, TX (US); Chandra Sekhar Bontu, Nepean (CA); Yi Song, Plano, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/792,784

(22) Filed: Mar. 11, 2013

(65) Prior Publication Data
US 2014/0242989 A1    Aug. 28, 2014

Related U.S. Application Data

(63) Continuation of application No. 13/776,985, filed on Feb. 26, 2013, now Pat. No. 9,084,264.

(51) Int. Cl.
*H04W 36/00* (2009.01)
*H04W 76/04* (2009.01)
*H04W 52/54* (2009.01)
*H04W 48/04* (2009.01)
*H04W 24/02* (2009.01)
*H04W 16/32* (2009.01)
(Continued)

(52) U.S. Cl.
CPC ......... *H04W 76/048* (2013.01); *H04W 24/02* (2013.01); *H04W 48/04* (2013.01); *H04W 52/54* (2013.01); *H04W 16/32* (2013.01); *H04W 36/04* (2013.01); *H04W 36/32* (2013.01)

(58) Field of Classification Search
CPC ........................... H04W 52/02; H04W 76/048
USPC ..... 455/418, 422.1, 436, 450; 370/311, 252, 370/329
See application file for complete search history.

(56) References Cited

U.S. PATENT DOCUMENTS

2007/0291728 A1    12/2007 Dalsgaard et al.
2008/0225772 A1    9/2008 Xu
(Continued)

OTHER PUBLICATIONS

3GPP TS36.211 V10.1.0 3rd Generation Partnership Project; Technical Specification Group Radio Access Network; Evolved Universal Terrestrial Radio Access (E-UTRA); Physical Channels and Modulation (Release 10) (Mar. 2011).
(Continued)

*Primary Examiner* — William Nealon
(74) *Attorney, Agent, or Firm* — Fish & Richardson P.C.

(57) ABSTRACT

A method at a UE operating in a hybrid network, the method receiving a separate discontinuous reception configuration at the UE for the macro cell than for a small cell; and configuring a receiver on the UE according to the separate discontinuous reception configurations. Further, a method at a macro cell, the method determining a mobility state of a UE; finding a service at the UE; and limiting the UE to associate only with the macro cell based on at least one of the determining and the finding. Further, a method at a UE in an environment with a macro and small cell using the same frequency, including receiving a first allocation for small cell within a common small HARQ subframe set; and receiving a second allocation for a macro cell within a common macro HARQ subframe set, wherein the sets do not overlap.

28 Claims, 12 Drawing Sheets

(51) Int. Cl.
  *H04W 36/04* (2009.01)
  *H04W 36/32* (2009.01)

(56) References Cited

U.S. PATENT DOCUMENTS

| | | | |
|---|---|---|---|
| 2008/0310381 A1* | 12/2008 | Taaghol et al. | 370/338 |
| 2009/0046632 A1* | 2/2009 | Nanda et al. | 370/328 |
| 2009/0221287 A1* | 9/2009 | Balasubramanian | H04W 48/16 455/434 |
| 2009/0252075 A1 | 10/2009 | Ji et al. | |
| 2011/0105119 A1* | 5/2011 | Bienas et al. | 455/436 |
| 2011/0116476 A1* | 5/2011 | Lee et al. | 370/331 |
| 2011/0170420 A1 | 7/2011 | Xi et al. | |
| 2011/0199951 A1 | 8/2011 | Kwon et al. | |
| 2011/0294491 A1 | 12/2011 | Fong et al. | |
| 2011/0317670 A1 | 12/2011 | Zhang et al. | |
| 2012/0039226 A1* | 2/2012 | Yang et al. | 370/311 |
| 2012/0108255 A1* | 5/2012 | Jo et al. | 455/450 |
| 2012/0142352 A1* | 6/2012 | Zhang et al. | 455/436 |
| 2013/0017820 A1* | 1/2013 | Drazynski et al. | 455/422.1 |
| 2013/0021929 A1* | 1/2013 | Kim | 370/252 |
| 2014/0185467 A1 | 7/2014 | Heo et al. | |
| 2014/0211673 A1 | 7/2014 | Lu et al. | |

OTHER PUBLICATIONS

3GPP TS36.321 V10.1.0 3rd Generation Partnership Project; Technical Specification Group Radio Access Network; Evolved Universal Terrestrial Radio Access (E-UTRA); Medium Access Control (MAC) protocol specification (Release 10) (Mar. 2011).
3GPP TS36.300 V10.1.0 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10) (Sep. 2010).
3GPP TS36.331 V10.1.0 3rd Generation Partnership Project; Technical Specification Group Radio Access Network; Evolved Universal Terrestrial Radio Access (E-UTRA); Radio Resource Control (RRC); Protocol specification (Release 10) (Mar. 2011).
R3-121453, 3GPP TSG-RAN3 Meeting #76 "LS on UL Interference for CB ICIC ", Prague, Czech Republic, May 21-25, 2012.
TR36.839 V2.0.0 "3rd Generation Partnership Project; Technical Specification Group Radio Access Network; Evolved Universal Terrestrial Radio Access (E-UTRA); Mobility Enhancements in Heterogeneous Networks Release 11)"(Aug. 2012).
3GPP TS 36.321 V11.1.0 (Dec. 2012) 3rd Generation Partnership Project;Technical Specification Group Radio Access Network; Evolved Universal Terrestrial Radio Access (E-UTRA); Medium Access Control (MAC) protocol specification (Release 11).
3GPP TS 36.331 V11.2.0 (Dec. 2012) 3rd Generation Partnership Project; Technical Specification Group Radio Access Network; Evolved Universal Terrestrial Radio Access (E-UTRA); Radio Resource Control (RRC); Protocol Specification (Release 11).
Office Action issued in U.S. Appl. No. 13/776,985 on Oct. 21, 2014.
Alcatel-Lucent, Alcatel-Lucent Shanghai Bell; "UE Speed-Based Methods and Mobility State Estimation for Improving the Mobility Performance in HetNets"; 3GPP TSG-RAN WG2 Meeting #78 (R2-122813); Prague, Czech Republic; May 21-25, 2012; 9 pages.
International Search Report and Written Opinion of the International Searching Authority issued in International Application No. PCT/US2014/017146 on May 3, 2016.
Office Action issued in Canadian Application No. 2,901,499 on Oct. 11, 2016; 3 pages.
Communication Pursuant to Article 94(3) EPC issued in Application No. 14709473.4 on Feb. 27, 2017; 6 pages.

* cited by examiner

METHOD AND APPARATUS FOR SMALL CELL CONFIGURATION IN A HETEROGENEOUS NETWORK ARCHITECTURE

RELATED APPLICATIONS

The present application is a continuation of and claims priority to U.S. patent application Ser. No. 13/776,985, filed on Feb. 26, 2013, now U.S. Pat. No. 9,084,264, which is incorporated by reference in its entirety.

FIELD OF THE DISCLOSURE

The present disclosure relates to small cells operating in heterogeneous networks, and in particular relates to discontinuous reception, semi-persistent scheduling (SPS)/Voice over Internet Protocol (VoIP) and non-carrier aggregation deployments for a user equipment (UE) operating in the heterogeneous network.

BACKGROUND

A heterogeneous network may include a high power node with one or more low power nodes co-existing with the high power node. For example, low power nodes form small cells such as pico cells, femto cells and relay cells while high power nodes form macro cells, which in general have a much larger cell coverage than the small cells.

In order to improve capacity and cell edge performance of the macro cells, low power nodes may be introduced within the macro cell to form the small cells. In some scenarios, the density of the small cells may be quite high. In this scenario, mobility and associated overhead could become a concern for a UE, especially for users with medium to high mobility. For example, user equipment (UE) travelling quickly may experience frequent handovers when moving across the small cells. Specifically, as the UE moves closer to a small cell, handover conditions indicate to the UE that the UE should handover to that small cell. However, when the small cell has a small coverage, fast changing radio conditions exist at the small cell edge and due to the frequent handovers, handover failure rates could increase, thereby impacting overall mobility performance.

Further, interference issues exist between the high power and low power cells. To remove interference, one deployment could be that the small cells use a different frequency layer from the macro cells. For example, the macro cells may use a 700 Mhz frequency band while small cells use a 3.5 Ghz frequency band. However this is merely an example. Such deployment can be referred to as an inter-site carrier aggregation (CA) based scheme. In accordance with this deployment, interference issues may be relieved at least between the macro cells and the small cells.

Other ways to mitigate interference is the use of almost blank subframes (ABS) where an interfering cell may transmit nothing or minimal information at lower transmission power to allow communication between an interfered with cell and its user equipments.

BRIEF DESCRIPTION OF THE DRAWINGS

The present disclosure will be better understood with reference to the drawings, in which:

FIG. 2 is a block diagram showing communication to a user equipment in a macro cell but close to a closed subscriber group cell the user equipment is not a member of;

DETAILED DESCRIPTION OF THE DRAWINGS

Figure 1:
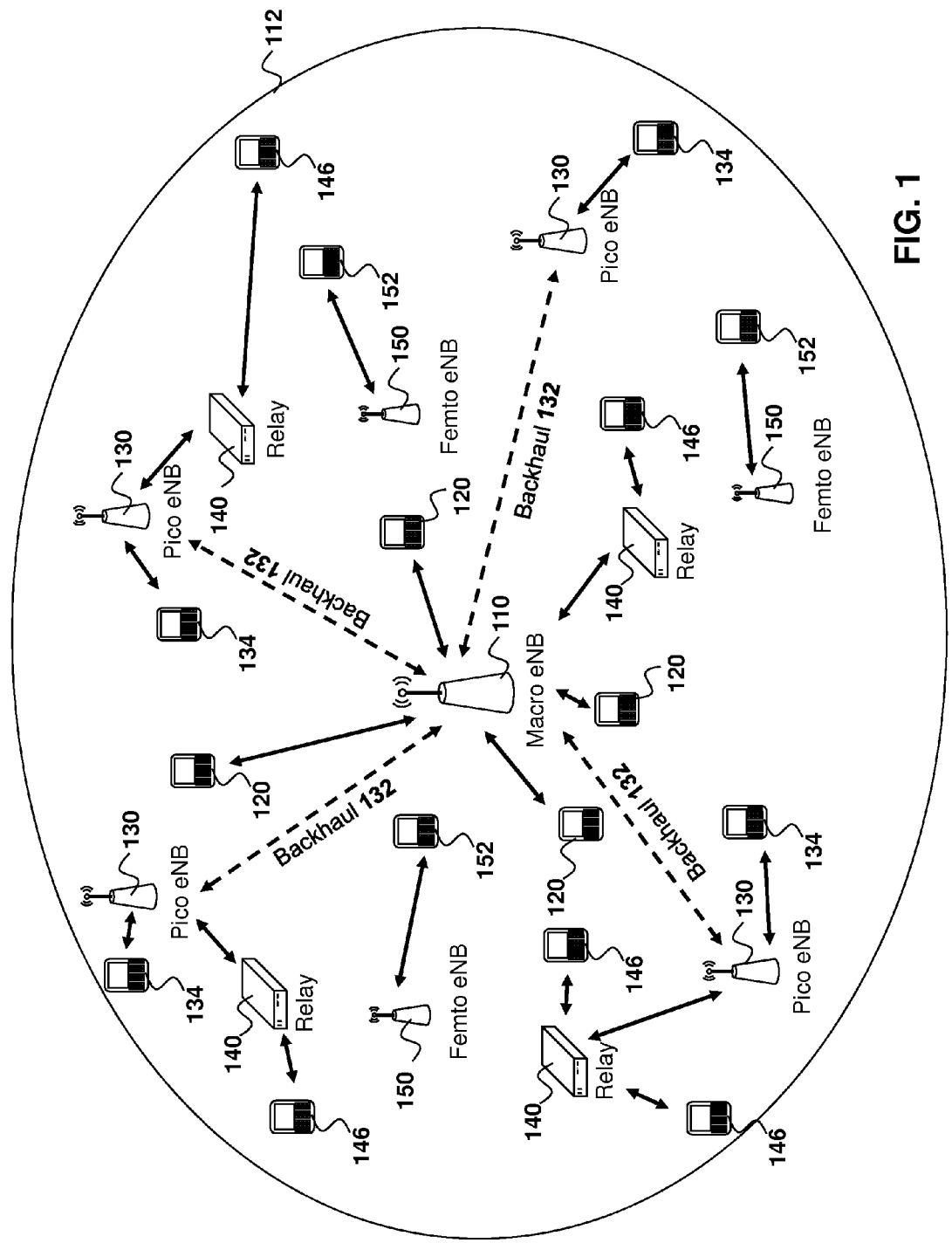
FIG. 1 is a block diagram showing an example heterogeneous network.

The present disclosure provides a method at a user equipment operating in a hybrid network environment with a macro cell and at least one small cell, the method comprising: receiving a separate discontinuous reception configuration at the user equipment for the macro cell than for a small cell; and configuring a receiver on the user equipment according to the separate discontinuous reception configuration for the macro cell and a discontinuous reception configuration for the small cell.

The present disclosure further provides a user equipment operating in a hybrid network environment with a macro cell and at least one small cell, the user equipment comprising: a processor; and a communications subsystem, wherein the user equipment is configured to: receive a separate discontinuous reception configuration at the user equipment for the macro cell than for a small cell; and configure a receiver on the user equipment according to the separate discontinuous reception configuration for the macro cell and a discontinuous reception configuration for the small cell.

The present disclosure further provides a method at a macro cell operating in a heterogeneous network having at least one small cell, the method comprising: determining a mobility state of a user equipment; finding a service at the user equipment; and limiting the user equipment to associate only with the macro cell based on at least one of the determining and the finding.

The present disclosure further provides a macro cell configured to operate in a heterogeneous network having at least one small cell, the macro cell comprising: a processor; and a communications subsystem, wherein the macro cell is configured to: determine a mobility state of a user equipment; find a service at the user equipment; and limit the user equipment to associate only with the macro cell based on at least one of the determining and the finding.

The present disclosure further provides a method at a macro cell operating in a heterogeneous network having a plurality of small cells, where a user equipment is moving from a first small cell to a second small cell, the method comprising: instructing, from the macro cell, the first small cell to maintain uplink and downlink semi-persistent scheduling bearers for a predefined time, wherein the predefined time overlaps with the second small cell attempting to establish semi-persistent scheduling bearers with the user equipment.

The present disclosure further provides a macro cell for operating in a heterogeneous network having a plurality of small cells, where a user equipment is moving from a first small cell to a second small cell, the macro cell comprising: a processor; and a communications subsystem, wherein the macro cell is configured to: instruct, the first small cell to maintain uplink and downlink semi-persistent scheduling bearers for a predefined time, wherein the predefined time overlaps with the second small cell attempting to establish semi-persistent scheduling bearers with the user equipment.

The present disclosure further provides a method at a user equipment operating in a heterogeneous network environment with a macro cell and at least one small cell operating on a same frequency, the method comprising: receiving a first allocation for a small cell within a common small hybrid automatic repeat request (HARQ) subframe set; and receiving a second allocation for a macro cell within a common macro HARQ subframe set, wherein the common small HARQ subframe set does not overlap with the common macro HARQ subframe set.

The present disclosure further provides a user equipment operating in a heterogeneous network environment with a macro cell and at least one small cell operating on a same frequency, the user equipment comprising: a processor; and a communications subsystem, wherein the user equipment is configured to: receive a first allocation for a small cell within a common small hybrid automatic repeat request (HARQ) subframe set; and receive a second allocation for a macro cell within a common macro HARQ subframe set, and wherein the common small HARQ subframe set does not overlap with the common macro HARQ subframe set.

Reference is now made to FIG. 1, which shows an example of a dense Third Generation Partnership Project (3GPP) Long Term Evolution-Advanced (LTE-A) heterogeneous network deployment scenario. Such deployment may be used to increase capacity and enhance coverage of a macro cell, for example.

Capacity increase allows for more data transfer within a network. Data capacity requirements increase significantly over time, and may require doubling the data capacity every year. Some forecasts see a 1000 times capacity increase demand in cellular networks by the year 2020.

Further, coverage issues at cell edges of traditional macro cells are always a bottleneck for both downlink and the uplink.

One possible technique to resolve coverage and capacity issues is the deployment of a heterogeneous network where small cells such as pico cells, femto cells and relays may enhance both the network throughput and the cell edge coverage. In particular, referring to FIG. 1, a macro eNB 110 has a coverage area 112.

Some UEs, shown as UEs 120, communicate directly with macro eNB 110. However, in order to offload some UEs from macro eNB 110, small cells are introduced within macro cell coverage area 112.

In particular, in the example of FIG. 1, pico cells 130 provide small cell coverage. Pico cells 130 may be located near the cell edge or may be located in high density or high usage areas to offload some data capacity to the pico cells.

In the embodiment of FIG. 1, pico cells 130 include a backhaul 132 such as a fiber or microwave backhaul, for example, between macro eNB 110 and the pico eNB. UEs 134 communicate directly with pico cells 130. The backhaul could be wireless or wire line.

In other cases, a relay 140 may be connected to either macro eNB 110 or to a pico eNB 130. As will be appreciated, relays provide enhanced coverage area or enhanced throughput for UEs 146 connected to them.

In other embodiments, femto cells 150 may be located within the macro cell coverage area 112 and be connected to UEs 152.

While the present disclosure is described with regard to the Long Term Evolution (LTE) network architecture, the present disclosure is not limited to such a network architecture and could include other network architectures as well. The use of LTE is merely meant as an example.

Based on FIG. 1 above, a heterogeneous network is a network which, in some embodiments, is designed to provide uniform coverage or capacity to serve a non-uniform distribution of users and needs. It includes the macro cells and the low-power nodes such as pico cells, femto cells, and relays. The macro cells overlay the low power nodes or small cells, sharing the same frequency or having different frequencies. Small cells are utilized to offload capacity from macro cells, improve indoor and cell edge performance, among other functionalities. Thus, the $3^{rd}$ Generation Partnership Project working groups are studying heterogeneous networks for performance enhancement enablers in LTE-A.

In heterogeneous network deployments, inter-cell interference coordination (ICIC) is one consideration. To help with ICIC, time domain based resource sharing or coordination has been adopted and referred to as enhanced ICIC (eICIC). For eICIC, the interfering node adopts an Almost Blank Subframe (ABS) at certain points and co-ordinates this with the interfered with cells so that the interfered with cells may provide vital information to UEs connected to the cells during the Almost Blank Subframe in order to avoid interference from the interfering cell for such information.

Figure 2:
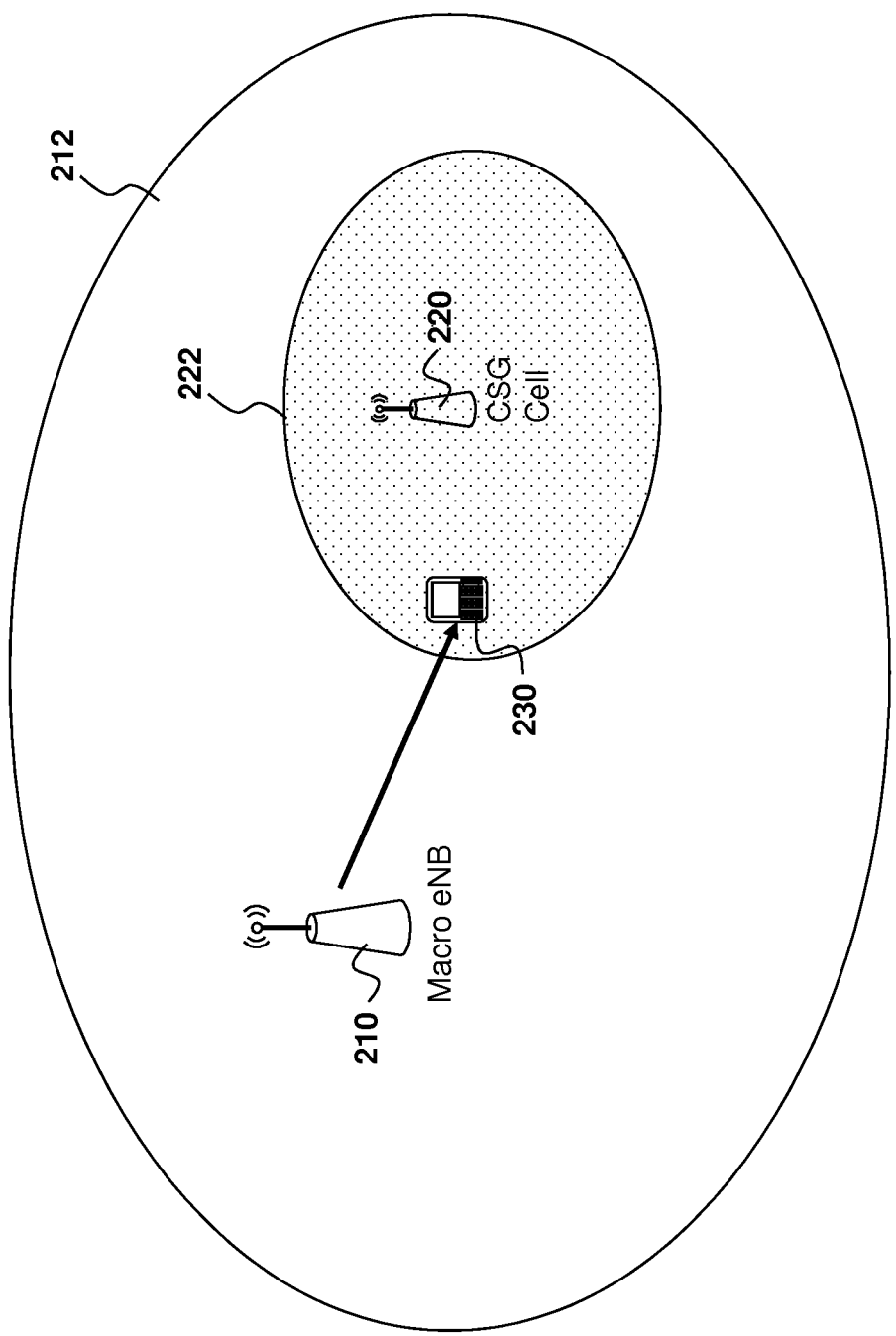

There are two main deployment scenarios where eICIC is utilized. The first is a Closed Subscriber Group (Femto cell) scenario. In this case, a dominant interference condition may happen when non-member users are in close proximity to the Closed Subscriber Group Cell. Reference is now made to FIG. 2.

As seen in FIG. 2, a macro eNB 210 includes a coverage area 212. Similarly, a CSG eNB 220 has a coverage area 222. A UE 230 that is not a member of the Closed Subscriber Group moves close to the CSG eNB 120 and thus receives significant interference from the CSG eNB 220.

Typically, Physical Downlink Control Channel (PDCCH) reception at a non-member UE 230 is severely interfered with by the downlink transmissions from the CSG eNB 220 to its member UEs. Interference to PDCCH reception of the macro eNB 210 for non-member UEs has a detrimental impact on both the uplink and downlink data transfer between the UE 230 and the macro eNB 210.

Additionally, other downlink control channels and reference signals, from both the macro cell and neighbor cells, which may be used for cell measurements and radio link monitoring, are also interfered with by the downlink transmission from the CSG eNB 220 to its member UEs.

Depending on the network deployment and strategy, it may not be possible to divert the users suffering from inter-cell interference to another Evolved-Universal Terrestrial Radio Access (E-UTRA) carrier or other Radio Access Technology (RAT). In this case, time domain ICIC may be used to allow such non-member UEs to remain served by the macro eNB 210 on the same frequency layer. In this case, interference may be mitigated by the CSG eNB 220 utilizing an ABS to protect some of the corresponding macro cell's subframes from interference.

A non-member UE 130 may be signaled to utilize the protected resources for radio resource measurements (RRM), radio link monitoring (RLM) and Channel State Information (CSI) measurements for the serving cell, allowing the UE to continue to be served by the macro cell under otherwise strong interference from the CSG cell.

A second deployment scenario that eICIC may be utilized with is described below with regard to FIG. 3.

Figure 3:
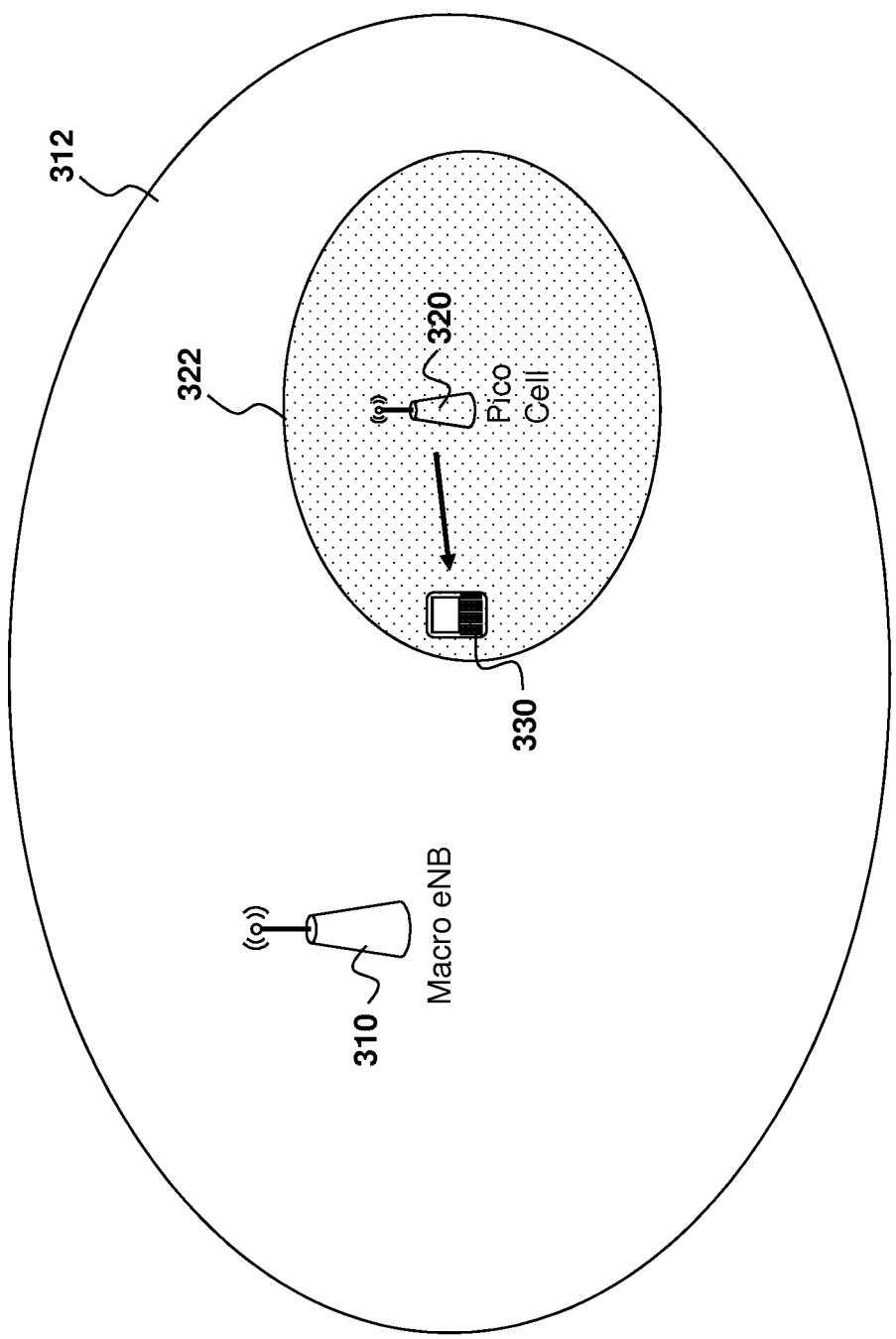
FIG. 3 is a block diagram showing communication to a user equipment in a pico cell but close to a the pico cell edge.

In the embodiment of FIG. 3, a macro eNB 310 has a coverage area 312. A pico eNB 320 has a coverage area 322. A UE 330 is connected to pico eNB 320 but is close to the pico cell edge.

In the scenario of FIG. 3, time domain ICIC may be utilized for pico cell users who are served in the edge of the serving pico cell. The pico UE may be still connected to the pico eNB 320 for the purpose of traffic offloading from the macro eNB 310 to pico eNB 320. Typically, the PDCCH would be severely interfered with by the downlink transmissions from the macro cell. In addition, other downlink control channels and reference signals from both the pico cell and neighbor cells, which may be used for cell measurements and radio link monitoring, are also interfered by the downlink transmission from the macro cell.

Time domain ICIC may be utilized to allow a UE such as UE 330 to remain served by the pico eNB 320 at an extended range on the same frequency layer. Such interference may be mitigated by the macro cell utilizing ABS to protect the corresponding pico cell's subframes from interference. A UE served by a pico cell uses the protected resources during the macro cell ABS for radio resource measurements, radio link monitoring and channel state information measurements for the serving pico cell and possibly for neighboring cells.

For time domain ICIC, subframe utilization across different cells is coordinated in time through either backhaul signaling or Operations Administration and Maintenance (OAM) configuration of the ABS patterns. The ABSs in the aggressor cell are used to protect resources in subframes in the victim cell receiving strong inter-cell interference from the aggressor cell.

ABSs are subframes with reduced transmit power, and may have no transmissions during these subframes in some cases, on at least some of the physical channels. In other embodiments the ABS has significantly reduced activity. The eNB ensures backward compatibility towards UEs by transmitting the necessary control channel and physical signals as well as System Information. Patterns based on ABSs signaled to the UE to restrict the UE measurements to specific subframes, called time domain measurement resource restrictions. There are different patterns depending on the type of measured cell, including serving and neighboring cells, and the measurement type, including RRM, RLM, among others.

Figure 4:
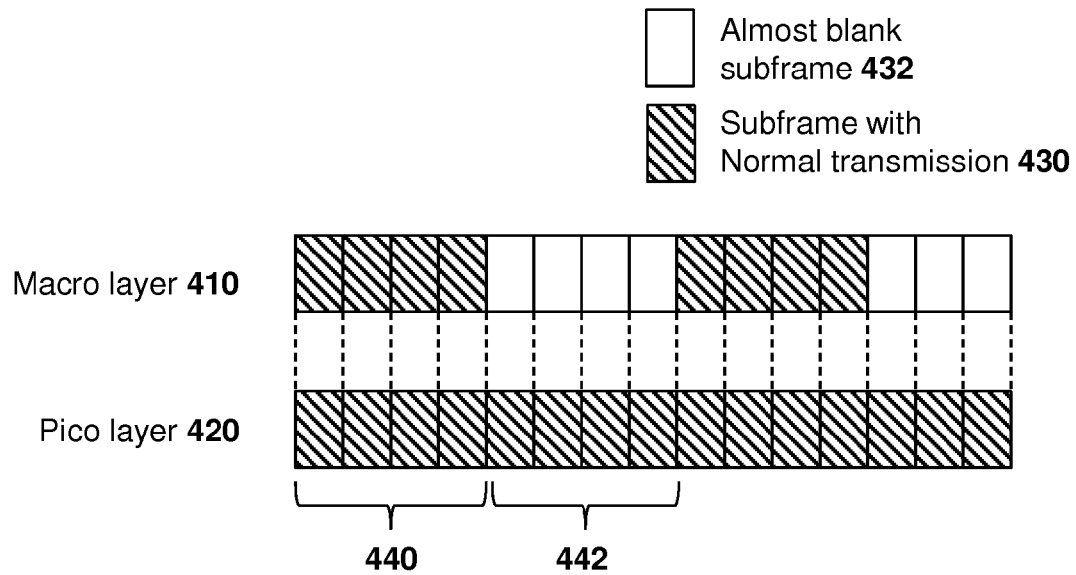
FIG. 4 is block diagram showing almost blank subframes on a macro cell.

One example of an ABS pattern for a pico scenario is shown with regard to FIG. 4. In particular, FIG. 4 shows a macro layer 410 and a pico layer 420. Subframes with normal transmissions are shown with the shading at reference numeral 430 whereas subframes that are almost blank subframes are shown with the shading at reference numeral 432.

In the example of FIG. 4, a macro eNB is the aggressor cell and configures and transfers the ABS patterns to the pico eNB, which is the victim cell. The macro eNB schedules no data transmissions or low-power data transmissions in the ABS subframes to protect UEs served by the pico eNB at the cell edge of the pico cell.

The pico eNB may schedule transmission to and from the UEs in the cell center regardless of the ABS subframes because the interference from the macro cell is sufficiently low. Meanwhile the pico eNB may schedule transmission to and from the UEs at the edge of the pico cell only during the ABS subframe transmission from macro layer 410.

In particular, during the subframes marked with reference numeral 440, the pico node only schedules user equipments in the cell center of the pico cell, since the macro eNB is also active in these subframes.

Conversely, during the subframes marked with reference numeral 442, the macro eNB has almost blank subframes and the pico node can, in addition to UEs that are in the cell center of the pico cell, schedule users in the range expansion area that would otherwise not be schedulable due to too high interference from the macro layer.

Figure 5:
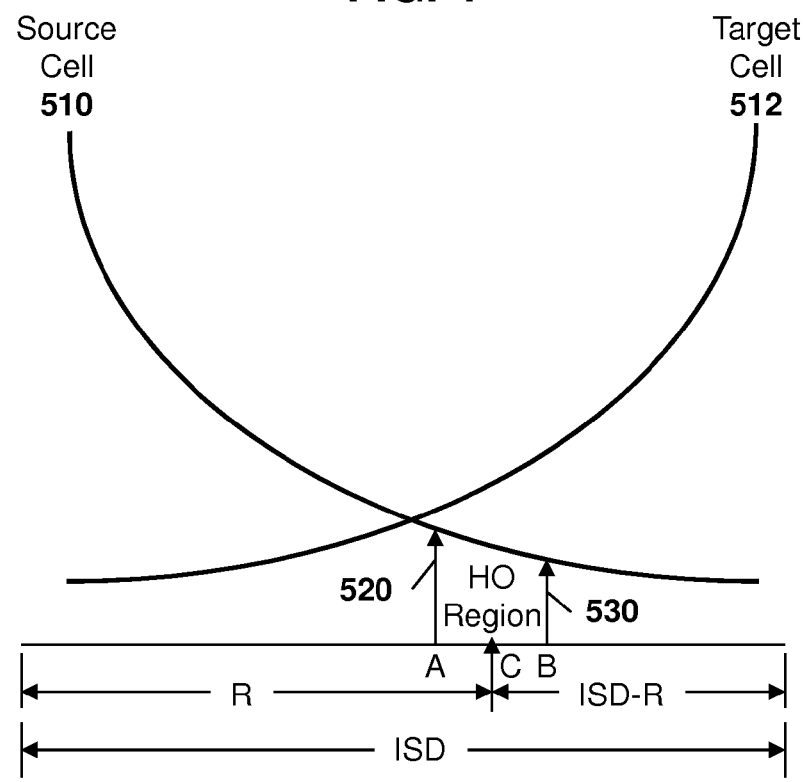
FIG. 5 is a plot showing signal strength of a source and target cell and providing a handover region.

One drawback of dense heterogeneous networks relates to mobility. Due to the different cell types in the heterogeneous network environment, mobility situation is more complicated than in a homogeneous network. Reference is now made to FIG. 5, which shows the handover region between the source cell and the target. The handover region is defined as the region between the point of an A3 event being triggered, to the point that radio link quality from the source cell is not sufficient for receiving a handover command.

In FIG. 5, the signal strength from source cell is shown by line 510 and the signal strength from the target cell is shown by line 512. The UE is connected to the source cell and is being transferred to a target cell.

Handover should not occur prior to a point shown by reference numeral 520. The point at reference numeral 520 is designated as "A" and is defined where the A3 event is triggered. The A3 event is triggered when the target power, designated as $P_{target}$, minus the source power, designated as $P_{source}$, is greater than or equal to the A3_offset. This is shown with equation 1 below.

$$P_{target} - P_{source} \geq A3\_offset \quad (1)$$

Handover should also not occur any later than the position shown by reference numeral 530 and designated as "B" in the example of FIG. 5. At the point designated by reference numeral 530 the PDCCH of the serving cell is out of coverage.

In a heterogeneous network environment where low power nodes are placed throughout a macro-cell layout, the size of the handover region depends on the cell type of the source the target cell. Further, the size of the handover region between a macro and a pico cell is far smaller than the size of the handover region between a macro to macro handover.

One example of handover region size of different types of handovers is shown below with regard to Table 1, where AR is the size of the handover region. Table 1 however shows exemplary values and is not necessarily definitive for each handover type.

TABLE 1

An example of HO region sizes of different types of HO

| source → target | size of HO region (unit: m) |
|---|---|
| Macro → Macro | ΔR = 22.5 |
| Pico → Pico | ΔR = 5.75 |
| Macro → Pico | ΔR = 2.375 |
| Pico → Macro | ΔR = 7 |

Therefore, in order to avoid handover failure, faster handover with a smaller time-to-trigger is desirable if the handover involves a small cell.

Further, in heterogeneous networks, in order to offload traffic from the macro cells, pico cells may employ a range expansion, where the UE will communicate with the pico cell even though the signal strength from the pico cell is weaker than that of the macro cell. As discussed above, to avoid interference from the macro cell, almost blank sub-frames are configured at the macro cell so that the UE in pico range expansion area can communicate with the pico cell. The handover region size may also depend on the range expansion capabilities of the source and target cell.

Thus, in heterogeneous networks, there may be many low powered nodes co-existing with high powered nodes. To improve the capacity the density of the small cells could be quite high. However, increasing the density of the small cells may create issues with regard to mobility and interference.

In one proposal by the 3$^{rd}$ Generation Partnership Project workgroup, a macro cell may use a first band for communication and the small cell may use a second band for communication. For example, the macro cell may use 700 Mhz while the small cells use 3.5 Ghz. However, this is not meant to be limiting and other deployment scenarios could also be employed. The use of two separate frequencies mitigates interference issues between the macro cell and small cells, but not between small cells.

Further, in many cases, the low power nodes and high power nodes are on the same carrier and could interfere with each other.

Various embodiments are provided herein to provide for enhancements to user equipment and network elements in a heterogeneous environment. Enhancements include improving battery or power source utilization at the user equipment, improving network usage and handover, and interference mitigation, among others.

In one embodiment of the present disclosure, discontinuous reception (DRX) operations for dual connections are provided.

In a further embodiment, semi-persistent scheduling and voice over IP services are managed in a heterogeneous network environment.

In a further embodiment, non-carrier aggregation based appointments are provided.

Each is discussed below.

DRX Operations for Dual Connections

DRX involves the turning off the radio of the UE for predetermined periods in order to save power supply resources on the UE. DRX configurations are known to both the network and the UE, and thus the network will not try to signal the UE during a period where the radio of the UE is off.

Current DRX operations under the Long Term Evolution architecture are per UE based, meaning that each UE only has one DRX configuration. However, this may not apply for an assisted serving cell scenario. In one embodiment of such a scenario, the macro serving cell operates in a low frequency and mainly exchanges control plane data with the UE, which may include mobility control information, measurement configuration information, assisted serving cell activation/deactivation information among others, and where the amount of data exchange is limited and infrequent. However, the assisted serving cell, which could be a small cell, may exchange a large amount of data with the UE since it handles the user plane (U-plane) communication. It is possible that the UE may connect to multiple assisted serving cells.

Figure 6:
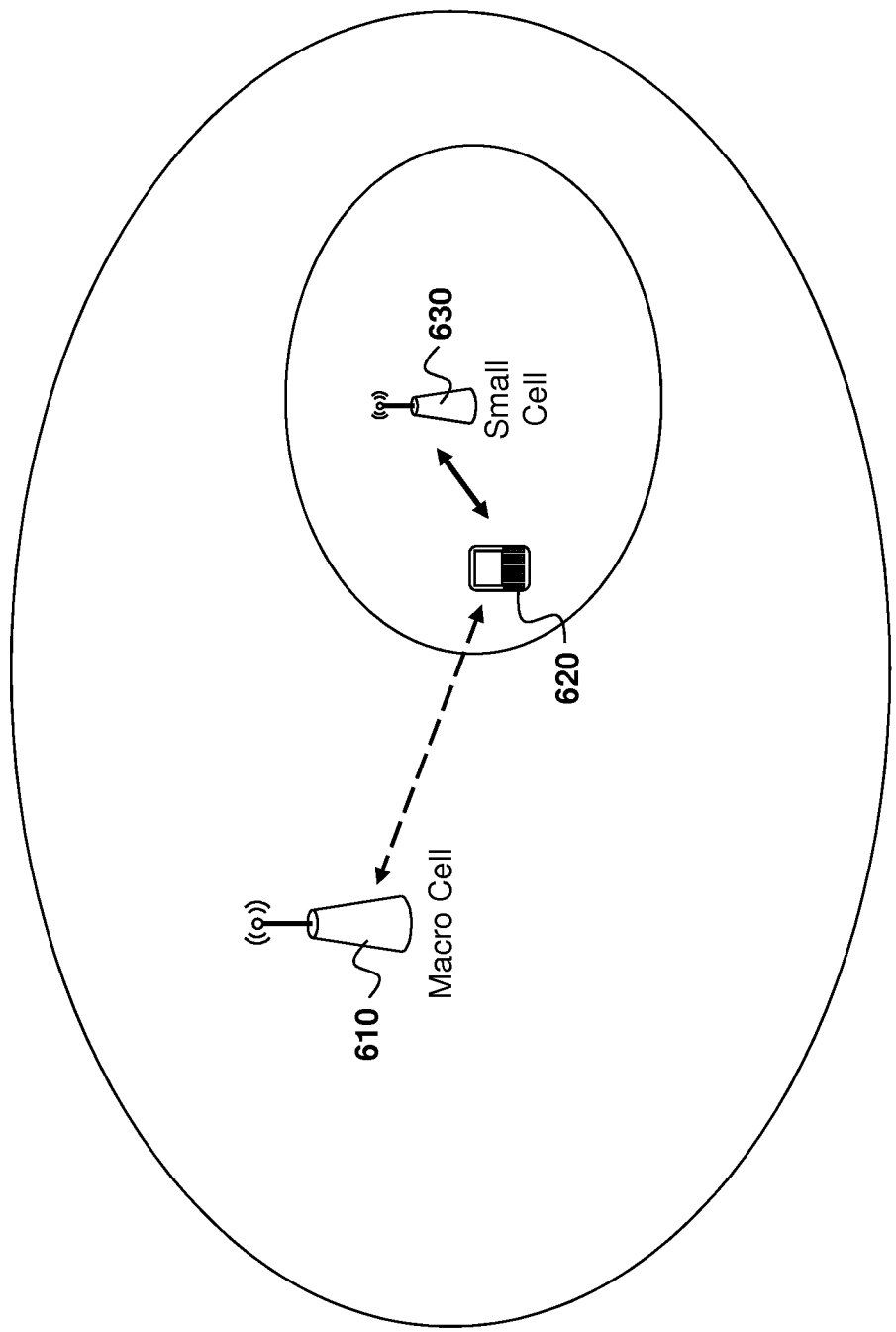
FIG. 6 is a block diagram showing example control and user plane communications between a user equipment, a macro cell and a small cell.

Reference is now made to FIG. 6, which shows an example system layout having a macro cell 610, a UE 620 and a small cell 630. In the embodiment of FIG. 6, control plane signaling exists between the macro cell 610 and the UE 620. Control plane (C-plane) signaling may mean the control signaling between the UE and the network, such as radio resource control (RRC) mobility control signaling.

U-plane signaling occurs between the UE 620 and small cell 630. U-plane signaling may mean user data exchange between the UE and network, such as stream video services, browsing, email exchange, among others.

In other embodiments, C-plane may mean RRC signaling radio bearers between the UE and network while the U-plane may mean the radio data bearers between the UE and the network.

In accordance with one embodiment of the present disclosure, it is not efficient for the UE to continuously monitor the PDCCH from the macro serving cell. However, the user may need to monitor the PDCCH from the assisted serving cell more frequently.

In order to optimize battery/power source performance, two different DRX configurations may be provided to the UE in one embodiment of the present disclosure. Thus, in one example, for a macro cell specific DRX configuration, some DRX functions may not be needed, for example, the DRX control elements, short DRX function, etc., due to the non-bursty, infrequent data transmissions. For the small cell, a second DRX configuration may be provided based on the large amount of data that may be provided from the small cell.

The use of two separate DRX configurations allows the UE to save power supply resources by reducing the amount of time the radio is on, especially for the macro cell. In one alternative, each DRX configuration may work on a specific frequency. Therefore, macro cell specific DRX only operates on the macro cell frequency while the small cell specific DRX only operates on the small cell frequency. In another alternative, if the UE connects to multiple small cells, multiple DRX configurations may be specified for small cells.

The two DRX configurations need to be signaled to the UE.

In one embodiment, both DRX configurations could be sent from the macro serving cell. Reference is now made to Table 2.

TABLE 2

MAC-MainConfig Information Element
MAC-MainConfig information element

```
-- ASN1START
MAC-MainConfig ::=          SEQUENCE {
    ul-SCH-Config           SEQUENCE {
        maxHARQ-Tx              ENUMERATED {
                            n1, n2, n3, n4, n5, n6, n7, n8,
                            n10, n12, n16, n20, n24, n28,
                            spare2, spare1} OPTIONAL,--Need ON
        periodicBSR-Timer           ENUMERATED {
                            sf5, sf10, sf16, sf20, sf32, sf40, sf64, sf80,
                            sf128, sf160, sf320, sf640, sf1280, sf2560,
                            infinity, spare1} OPTIONAL,--Need ON
        retxBSR-Timer               ENUMERATED {
                    sf320, sf640, sf1280, sf2560, sf5120,
                            sf10240, spare2, spare1},
        ttiBundling             BOOLEAN
    }                       OPTIONAL,    -- Need ON
    drx-Config-Control      DRX-Config  OPTIONAL, -- Need ON
    drx-Config-Assisted     DRX-Config  OPTIONAL, -- Need ON
    timeAlignmentTimerDedicated     TimeAlignmentTimer,
    phr-Config                      CHOICE {
        release                 NULL,
        setup                           SEQUENCE {
            periodicPHR-Timer   ENUMERATED {sf10, sf20, sf50, sf100,
                    sf200, sf500, sf1000, infinity},
            prohibitPHR-Timer   ENUMERATED {sf0, sf10, sf20, sf50,
                    sf100, sf200, sf500, sf1000},
            dl-PathlossChange   ENUMERATED {dB1, dB3, dB6, infinity}
        }
    }                           OPTIONAL,    -- Need ON
    ...,
    [[  sr-ProhibitTimer-r9     INTEGER (0..7)      OPTIONAL-- Need ON
    ]],
    [[  mac-MainConfig-v1020    SEQUENCE {
            sCellDeactivationTimer-r10  ENUMERATED {
                    rf2, rf4, rf8, rf16, rf32, rf64, rf128,
                    spare}       OPTIONAL,    -- Need OP
            extendedBSR-Sizes-r10       ENUMERATED
                    {setup}       OPTIONAL,    -- Need OR
            extendedPHR-r10             ENUMERATED
                    {setup}       OPTIONAL     -- Need OR
        }                     OPTIONAL  -- Need ON
    ]]
}
DRX-Config-Control ::=              CHOICE {
    release         NULL,
    setup           SEQUENCE {
        onDurationTimer-control         ENUMERATED {
            psf1, psf2, psf3, psf4, psf5, psf6, psf8, psf10, psf20, psf30,
            psf40, psf50, psf60, psf80, psf100, psf200},
        drx-InactivityTimer-control   ENUMERATED {
            psf1, psf2, psf3, psf4, psf5, psf6, psf8, psf10, psf20, psf30,
            psf40, psf50, psf60, psf80, psf100, psf200, psf300, psf500,
            psf750, psf1280, psf1920, psf2560, psf0-v1020, spare9, spare8,
            spare7,spare6,spare5, spare4, spare3, spare2, spare1},
        drx-RetransmissionTimer-control    ENUMERATED {
            psf1, psf2, psf4, psf6, psf8, psf16, psf24, psf33},
        longDRX-CycleStartOffset-control           CHOICE {
            sf10                INTEGER(0..9),
            sf20                INTEGER(0..19),
            sf32                INTEGER(0..31),
            sf40                INTEGER(0..39),
            sf64                INTEGER(0..63),
            sf80                INTEGER(0..79),
            sf128               INTEGER(0..127),
            sf160               INTEGER(0..159),
            sf256               INTEGER(0..255),
            sf320               INTEGER(0..319),
            sf512               INTEGER(0..511),
            sf640               INTEGER(0..639),
            sf1024              INTEGER(0..1023),
            sf1280              INTEGER(0..1279),
            sf2048              INTEGER(0..2047),
            sf2560              INTEGER(0..2559)
        },
        shortDRX   SEQUENCE {
            shortDRX-Cycle   ENUMERATED {
```

TABLE 2-continued

MAC-MainConfig Information Element
MAC-MainConfig information element

```
                    sf2, sf5, sf8, sf10, sf16, sf20, sf32, sf40, sf64, sf80,
                    sf128, sf160, sf256, sf320, sf512, sf640},
                drxShortCycleTimer INTEGER (1...16)
            } OPTIONAL--Need OR
        }
    }
DRX-Config-Assited ::=          CHOICE {
        release     NULL,
        setup               SEQUENCE {
            onDurationTimer-Assited    ENUMERATED {
                psf1, psf2, psf3, psf4, psf5, psf6, psf8, psf10, psf20, psf30,
                psf40, psf50, psf60, psf80, psf100,psf200},
            drx-InactivityTimer-Assited   ENUMERATED {
                psf1, psf2, psf3, psf4, psf5, psf6, psf8, psf10, psf20, psf30,
                psf40, psf50, psf60, psf80, psf100, psf200, psf300, psf500,
                psf750, psf1280, psf1920, psf2560, psf0-v1020, spare9, spare8,
                spare7, spare6, spare5, spare4, spare3, spare2, spare1},
            drx-RetransmissionTimer-Assited     ENUMERATED {
                psf1, psf2, psf4, psf6, psf8, psf16, psf24, psf33},
            longDRX-CycleStartOffset-Assited    CHOICE {
                sf10                INTEGER(0..9),
                sf20                INTEGER(0..19),
                sf32                INTEGER(0..31),
                sf40                INTEGER(0..39),
                sf64                INTEGER(0..63),
                sf80                INTEGER(0..79),
                sf128               INTEGER(0..127),
                sf160               INTEGER(0..159),
                sf256               INTEGER(0..255),
                sf320               INTEGER(0..319),
                sf512               INTEGER(0..511),
                sf640               INTEGER(0..639),
                sf1024              INTEGER(0..1023),
                sf1280              INTEGER(0..1279),
                sf2048              INTEGER(0..2047),
                sf2560              INTEGER(0..2559)
            },
            shortDRX-Assited    SEQUENCE {
                shortDRX-Cycle-Assited       ENUMERATED {
                        sf2, sf5, sf8, sf10, sf16, sf20, sf32, sf40, sf64, sf80,
                        sf128, sf160, sf256, sf320, sf512, sf640},
                drxShortCycleTimer-Assited INTEGER (1..16)
            }           OPTIONAL -- Need OR
        }
    }
-- ASN1STOP
```

As seen in Table 2 above, two separate DRX configurations are provided, namely DRX-config-control and DRX-config-assisted. If there are multiple assisting cells, more DRX-config-assisted fields may be appended as needed. Alternatively one configuration for all assisting cells may be provided.

The DRX-config-control takes the current existing DRX-Config from the MAC-mainConfig information element, and adapts it to provide for macro cell specific DRX. In particular, as seen in Table 2 above, the short DRX information from the previous DRX-config is removed since it is not needed. Further, a second DRX-config-assisted is provided which provides for both the standard DRX configuration as well as a short DRX assisted configuration.

In a further embodiment, the macro serving cell could signal the macro cell specific DRX configuration to the UE and the small cell could signal the small cell specific DRX configuration to the UE individually.

On the UE side, the UE could operate the DRX in two different frequency layers and these may be independent of each other. During the active time of the macro serving cell, the UE may monitor the PDCCH from the macros serving cell and during the active time of the assisted serving cell, the UE may monitor the PDCCH from the assisted serving cell. In this case, the active time may be split into two different layers as well as other DRX functions. This also includes uplink control signaling transmissions and an example of modifications to current TS 36.321 Specifications are shown with regard to Table 3, below.

TABLE 3

3GPP TS 36.321, S. 5.7 Discontinuous Reception 5.7 Discontinuous Reception (DRX)
The UE may be configured by RRC with a DRX functionality that controls the UE's PDCCH monitoring activity for the UE's C-RNTI, TPC-PUCCH-RNTI, TPC-PUSCH-RNTI and Semi-Persistent Scheduling C-RNTI (if configured) on control serving cell or assisted serving

TABLE 3-continued

| 3GPP TS 36.321, S. 5.7 Discontinuous Reception |
| --- | cell. When in RRC_CONNECTED, if DRX is configured, the UE is allowed to monitor the PDCCH discontinuously using the DRX operation specified in this subclause; otherwise the UE monitors the PDCCH continuously. When using DRX operation, the UE shall also monitor PDCCH according to requirements found in other subclauses of this specification. RRC controls DRX operation by configuring the timers onDurationTimer-control, drx-InactivityTimer-control, drx-RetransmissionTimer-control (one per DL HARQ process except for the broadcast process), the longDRX-Cycle-control, the value of the drxStartOffset-control for control serving cell and/or onDurationTimer-assisted, drx-InactivityTimer-assisted, drx-RetransmissionTimer-assisted, the longDRX-Cycle-assisted, the value of the drxStartOffset-assisted and optionally the drxShortCycleTimer-assisted and shortDRX-Cycle-assisted for assisted serving cell.
A HARQ RTT timer per DL HARQ process (except for the broadcast process) is also defined (see subclause 7.7) on both the control serving cell and the assisted serving cell.
On the control serving cell, when a DRX cycle is configured, the Active Time (here active time refers to active time for control serving cell) includes the time while:
- onDurationTimer-control or drx-InactivityTimer-control or drx-RetransmissionTimer-control or mac-ContentionResolutionTimer (as described in subclause 5.1.5) is running; or
- a Scheduling Request is sent on PUCCH on the control serving cell and is pending (as described in subclause 5.4.4); or
- an uplink grant for a pending HARQ retransmission can occur on the control serving cell and there is data in the corresponding HARQ buffer; or
- a PDCCH on the control serving cell indicating a new transmission addressed to the C-RNTI of the UE has not been received after successful reception of a Random Access Response for the preamble not selected by the UE (as described in subclause 5.1.4).

When DRX is configured, the UE shall for each subframe:
- if a HARQ RTT Timer expires in this subframe and the data of the corresponding HARQ process was not successfully decoded:
    - start the drx-RetransmissionTimer-control for the corresponding HARQ process.
    - ~~if a DRX Command MAC control element is received:~~
        - ~~stop onDurationTimer;~~
        - ~~stop drx-InactivityTimer.~~
- if drx-InactivityTimer-control expires ~~or a DRX Command MAC control element~~ is received in this subframe:
    - ~~if the Short DRX cycle is configured:~~
        - ~~start or restart drxShortCycleTimer;~~
        - ~~use the Short DRX Cycle.~~
    - ~~else:~~
        - use the Long DRX cycle.
- ~~if drxShortCycleTimer expires in this subframe:~~
    - ~~use the Long DRX cycle.~~
- ~~If the Short DRX Cycle is used and [(SFN* 10) + subframe number] modulo (shortDRX-Cycle) = (drxStartOffset) module (shortDRX-Cycle ); or~~
- if the Long DRX Cycle is used and [(SFN * 10) + subframe number] modulo (longDRX-Cycle-control ) = drxStartOffset-control:
    - start onDurationTimer-control.
- during the Active Time for the control serving cell, for a PDCCH-subframe on the control serving cell, if the subframe is not required for uplink transmission for half-duplex FDD UE operation and if the subframe is not part of a configured measurement gap:
    - monitor the PDCCH on the control serving cell;
    - if the PDCCH on the control serving cell indicates a DL transmission on the control serving cell or if a DL assignment on the control serving cell has been configured for this subframe:
        - start the HARQ RTT Timer for the corresponding HARQ process;
        - stop the drx-RetransmissionTimer-control for the corresponding HARQ process.
    - if the PDCCH on the control serving cell indicates a new transmission (DL or UL):
        - start or restart drx-InactivityTimer-control.
- when not in Active Time, type-0-triggered SRS [2] shall not be reported to the control serving cell.
- if CQI masking (cqi-Mask-control) is setup by upper layers:
    - when onDurationTimer-control is not running, CQI/PMI/RI/PTI on PUCCH shall not be reported to the control serving cell.
- else:
    - when not in Active Time, CQI/PMI/RI/PTI on PUCCH shall not be reported to the control serving cell.

Regardless of whether the UE is monitoring PDCCH on the control serving cell or not, the UE receives and transmits HARQ feedback and transmits type-1-triggered SRS [2] when such is expected on the control serving cell.
On the assisted serving cell, when a DRX cycle is configured, the Active Time (here active time refers to active time for assisted serving cell) includes the time while:
- onDurationTimer-assisted or drx-InactivityTimer-assisted or drx-RetransmissionTimer-assisted or mac-ContentionResolutionTimer (as described in subclause 5.1.5) is running; or TABLE 3-continued 3GPP TS 36.321, S. 5.7 Discontinuous Reception

- a Scheduling Request is sent on PUCCH on the assisted serving cell and is pending (as described in subclause 5.4.4); or
- an uplink grant for a pending HARQ retransmission can occur on the assisted serving cell and there is data in the corresponding HARQ buffer; or
- a PDCCH on the assisted serving cell indicating a new transmission addressed to the C-RNTI of the UE has not been received after successful reception of a Random Access Response for the preamble not selected by the UE (as described in subclause 5.1.4).

When DRX is configured, the UE shall for each subframe:
- if a HARQ RTT Timer expires in this subframe and the data of the corresponding HARQ process was not successfully decoded:
    - start the drx-RetransmissionTimer-assisted for the corresponding HARQ process.
- if a DRX Command MAC control element is received on the assisted serving cell:
    - stop onDurationTimer-assisted;
    - stop drx-InactivityTimer-assisted.
- if drx-InactivityTimer-assisted expires or a DRX Command MAC control element is received in this subframe on the assisted serving cell:
    - if the Short DRX cycle is configured:
        - start or restart drxShortCycleTimer-assisted;
        - use the Short DRX Cycle.
    - else:
        - use the Long DRX cycle.
- if drxShortCycleTimer-assisted expires in this subframe:
    - use the Long DRX cycle.
- If the Short DRX Cycle is used and [(SFN * 10) + subframe number] modulo (shortDRX-Cycle-assisted) = (drxStartOffset-assisted) modulo (shortDRX-Cycle-assisted); or
- if the Long DRX Cycle is used and [(SFN * 10) + subframe number] modulo (longDRX-Cycle-assisted ) = drxStartOffset-assisted:
    - start onDurationTimer-assisted.
- during the Active Time for the assisted serving cell, for a PDCCH-subframe on the assisted serving cell, if the subframe is not required for uplink transmission for half-duplex FDD UE operation and if the subframe is not part of a configured measurement gap:
    - monitor the PDCCH on the assisted serving cell;
    - if the PDCCH on the assisted serving cell indicates a DL transmission or if a DL assignment on the assisted serving cell has been configured for this subframe:
        - start the HARQ RTT Timer for the corresponding HARQ process;
        - stop the drx-RetransmissionTimer-assisted for the corresponding HARQ process.
    - if the PDCCH on the assisted serving cell indicates a new transmission (DL or UL):
        - start or restart drx-InactivityTimer-assisted.
- when not in Active Time, type-0-triggered SRS [2] shall not be reported to the assisted serving cell.
- if CQI masking (cqi-Mask-assisted) is setup by upper layers:
    - when onDurationTimer-assisted is not running, CQI/PMI/RI/PTI on PUCCH shall not be reported to the assisted serving cell.
- else:
    - when not in Active Time, CQI/PMI/RI/PTI on PUCCH shall not be reported to the assisted serving cell.

Regardless of whether the UE is monitoring PDCCH or not, the UE receives and transmits HARQ feedback and transmits type-1-triggered SRS [2] when such is expected on the assisted serving cell.

As seen in Table 3 above, the 3GPP TS 36.321 Specification is modified, shown in bold, to split the DRX reception between a control serving cell and assisted serving cell. Various timers include both control timers and assisted timers. Further, the DRX configuration is adapted to provide only long DRX for the macro cell and short DRX timer information is removed. Further, the 3GPP 36.321 Specification is duplicated to provide for functionality for the assisted serving cell.

In other embodiments, the network may signal only one DRX configuration to the UE, which may be a macro cell specific DRX configuration, while the small cell always operates in a continuous mode.

In other embodiments, the network may signal only one DRX configuration to the UE, which may be a macro cell specific DRX configuration or small cell DRX configuration, while for the other DRX configurations, only the differences are signaled.

In a further embodiment, the active time that the macro serving cell may be the inactive time of the small cell, while the active time of small cell may be the inactive time of the macro serving cell. In this case, the receiver of the UE may be active on only one frequency in a given subframe to reduce battery or power use at the UE. In this case, the network may only need to configure one DRX configuration due to the complimentary features between the macro cell and the small cell.

Figure 7:
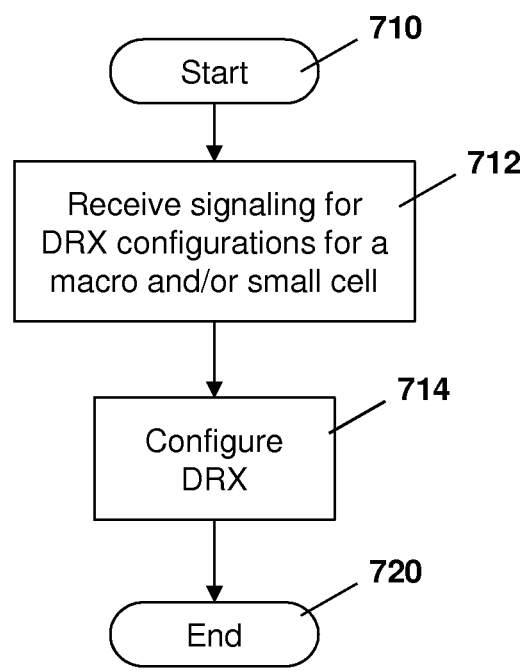
FIG. 7 is a process diagram showing an example method at a user equipment for configuring multiple DRX configurations.

Based on the above, reference is now made to FIG. 7. The process of FIG. 7 starts at block 710 and proceeds to block 712 in which the UE receives signaling for DRX configurations in accordance with the above. In particular, at block 712, the UE may receive DRX configurations that are separate for the macro cell and the small cells. In one embodiment, the receiving may be directly from the macro cell. In other embodiments the receiving may be from both the macro cell and the small cell.

In accordance with one embodiment, the receiving at block 712 may further only include macro cell configurations if the small cell is always operated in a continuous mode. Alternatively, the receiving at block 712 may also be only from the macro cell if the small cell and the macro cell operate in a complimentary fashion where one frequency is on while the other frequency is off.

From block 712 the process proceeds to block 714 in which the UE configures the DRX operation at the UE based on the configurations received at block 712.

From block 714 the process proceeds to block 720 and ends.

SPS/VoIP Services

Semi-Persistent Scheduling (SPS) and Voice Over Internet Protocol (VoIP) services, along with other similar services, have a properties of a constant bit rate and also have low latency/jitter requirements. Such services may not be suitable for small cells to support when the UE is moving quickly. In particular, if a UE is moving quickly through a network having small cells, the constant handover between small cells may degrade or disrupt such services.

According, various solutions are proposed. In one embodiment, a mobility state based solution is provided where, if the user is moving relatively quickly, the UE may only associate with the macro serving cell and no switching is therefore needed between the small cells. Conversely, when the UE is at a low or medium speed, the small cell may be a good choice for the voice service. For example, if a user is sitting in an office, it may be better for the user to connect to the small cell for voice service due to the smaller path loss and offloading benefits. Such use of a small cell could also save a power supply at the UE when connecting to the small cell.

In an alternative embodiment, when the user is moving from one small cell to another small cell, the macro cell may coordinate between the two small cells in order to transmit/receive the voice over IP or SPS data.

Each solution is described below.

Mobility State Based Solution

In one embodiment, the association of the UE to a network element may be dependent on the speed and/or mobility state of the UE and/or services required by the UE. A high speed UE may be restricted to associate with the macro cell only, while medium or low speed UEs may associate with small cells as well as the macro cell. The use of the terms "low", "medium", and "high" speed is relative, and the present disclosure is not meant to be limited to any particular speeds. The speed could also mean mobility state, not necessarily absolute speed. The thresholds could be set based on a carrier, device manufacturer, user or other party and the threshold may not be between various cells in a network. Thus, in some cases the threshold could be predetermined, such as for example high speed being greater than 60 km/h, but in other cases may be signaled to the UE. Alternatively, the network element itself may determine the speed of the UE and thus provide for configurations based on the speed that the network element detects.

Thus, in a first embodiment, if the user is moving relatively quickly and is greater than a threshold, the UE may only associate with the macro serving cell and no switching is needed between the small cells.

The macro cell may first determine the UE's mobility state or the UE may report its mobility state to the macro cell. For example, the macro cell could use the number of cells that the UE has been handed over or switched off to during the pre-defined time window to determine the UE's mobility state. The cell size or the measured RSRP/RSRQ values from the UE may also be considered. This could be considered or calculated either at the UE side or at the network side, such as at the eNB. The UE could also use its global positioning system (GPS) receiver if available or the number of cells that UE has selected or reselected during a pre-defined time window to determine its mobility state and report this information to the macro cell.

The macro cell may further obtain service information for the UE. This may be done in several ways. One way would be that the UE reports its service information to the macro cell or the UE directly requests to be associated with the macro cell only. Alternatively, the macro cell could query the service information of the UE either from the UE or from the core network.

Based on one or both of the service information and the mobility state information, the macro cell could determine whether to make the UE only associate with the macro cell.

In some cases, the UE may make a request to only associate with the macro cell. For example, the UE may have determined that it is moving at a rate greater than a threshold while using a particular service. In this case that, the macro cell may accept or reject that request. Such acceptance or rejection may also be based on factors such as the mobility and the service information previously determined/reported, among other factors.

Further, the macro cell may broadcast certain information to the UE to help the UE determine whether to send such a request appropriately. For example, the network may send the UE a mobility state threshold. Only when the mobility state of the UE is above or equal to the threshold, should the UE send a request to be associated only to the macro cell. Thus, for example, the network could indicate that only when the mobility state is "high" then the UE should send the request.

In some embodiments, the network may also indicate service requirements. For example, the UE may only send such request if it is involved in the VoIP service.

When the UE is in a low or medium speed, the small cell may be a good choice for the voice service.

Figure 8:
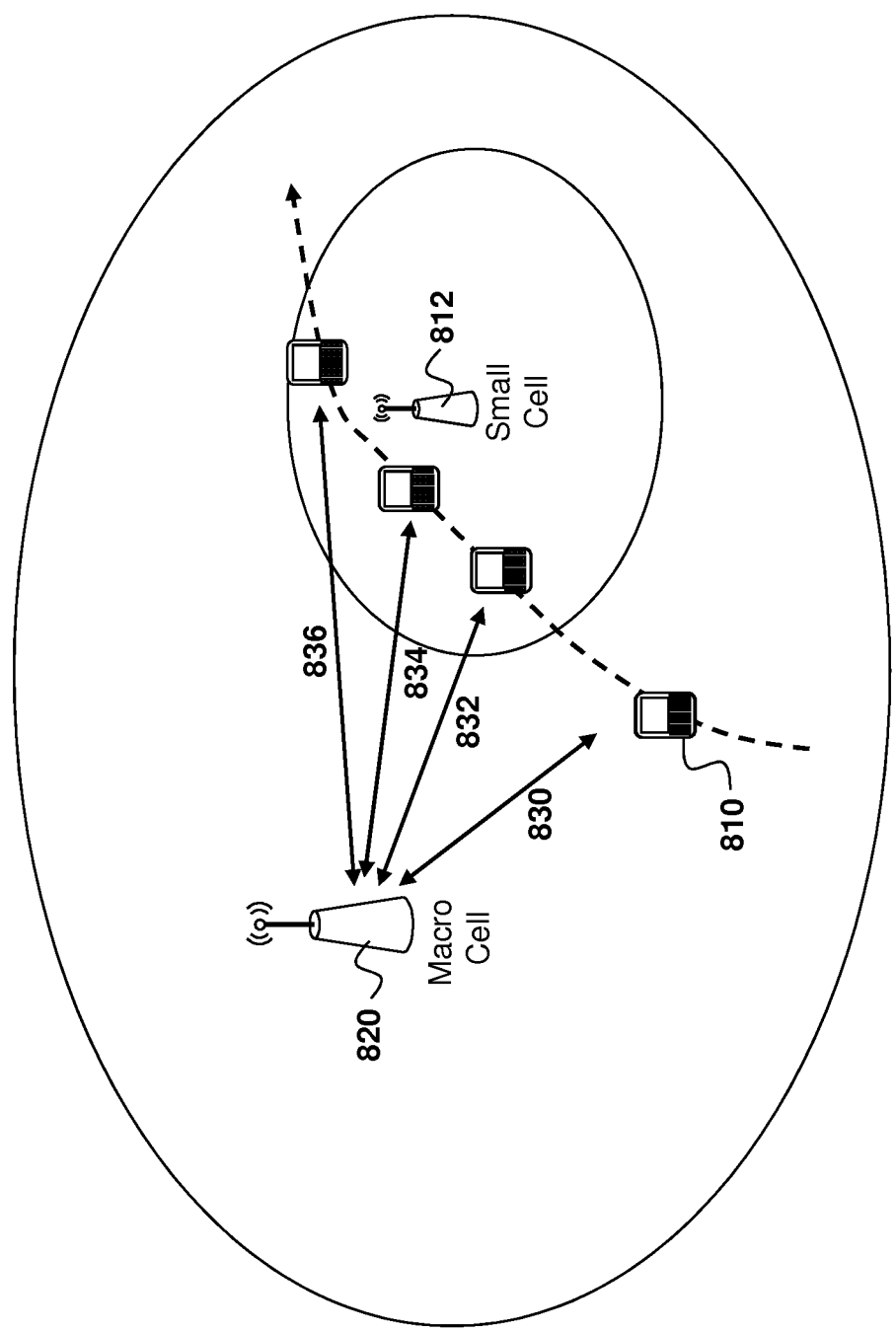
FIG. 8 is a block diagram showing a fast moving user equipment within a heterogeneous network.

Reference is now made to FIG. 8. FIG. 8 shows an example of a UE 810 which moves at a high speed and may move close to small cell 812. However, due to the high speed of the device, along with its VoIP service, the UE 810 may only associate with macro cell 820 in the example of FIG. 8. Thus, as shown by lines 830, 832, 834 and 836, the UE 810 is associated only with macro cell 820 even though it is close to small cell 812.

Figure 9:
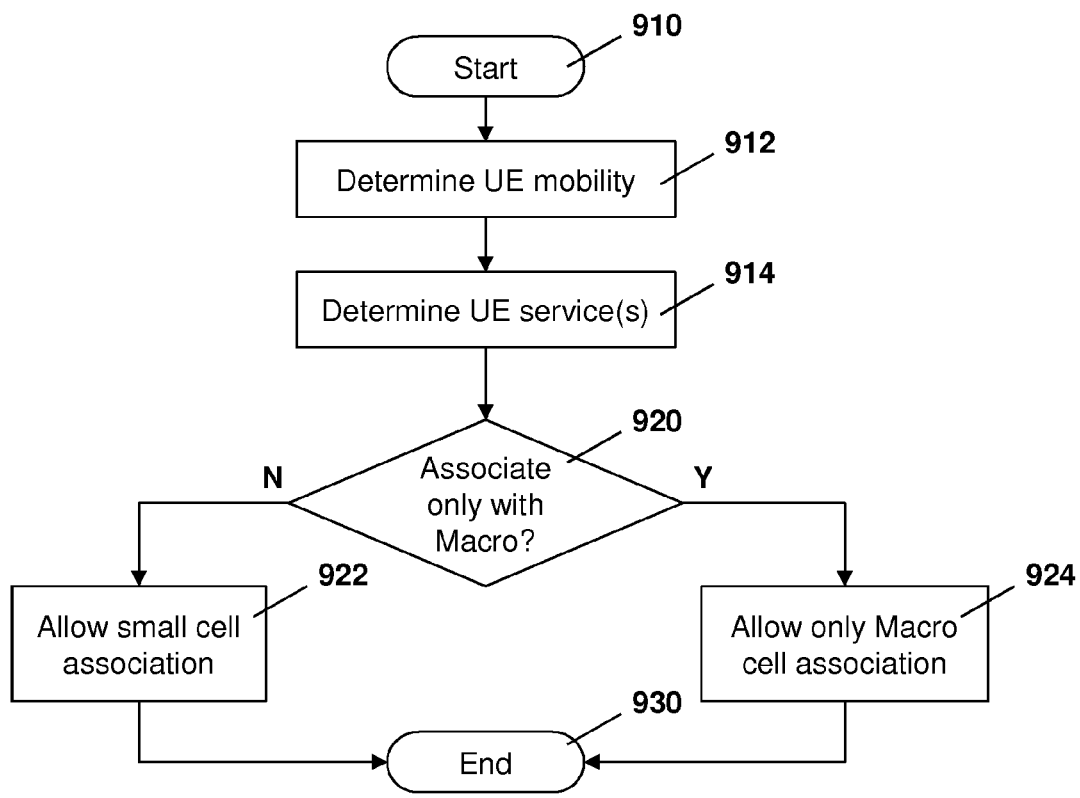
FIG. 9 is a process diagram showing an example method at a network element for controlling UE associations.

Reference is now made to FIG. 9, which shows a process at a macro cell and starts at block 910. The process then proceeds to block 912 in which the macro cell determines the mobility of a UE. As indicated above, this may be done by either the cell determining the number of transitions, the macro cell observing the UE or by reporting from the UE.

The process then proceeds to block 914 in which the service of the UE is determined. As indicated above, this may be done by the macro cell querying the UE or receiving reports from the UE, or the macro cell querying the core network in some embodiments.

From block 914 the process proceeds to block 920 in which a check is made to determine whether the UE should only be associated with a macro cell only. The check at block 920 may be based on a request at the UE or may be based on certain determinations at block 912 and 914.

If the check at block 920 determines that the UE should not only be associated with the macro cell then the process proceeds to block 922 in which the UE is allowed to be associated with both the macro cell and small cells. The process then proceeds from block 922 to block 930 and ends.

Conversely, if the check at block 920 determines that the UE should only be associated with the macro cell then the process proceeds to block 924 in which the UE is allowed to only associate with the macro cell. From block 924 the process proceeds to block 930 and ends.

When a small cell is used to support SPS/VoIP services, for example when the UE is moving at medium or slow speeds, a determination may need to be made to determine how control signaling is performed. Two types of SPS scheduling exists. One is the radio resource control (RRC) level SPS configurations and the other is SPS activation/de-activation.

For SPS activation/de-activation, such signaling may be suitable to be transmitted from the small cell if the small cell has a PDCCH or Enhanced PDCCH (EPDCCH). However, if the small cell does not have PDCCH/EPDCCH, then cross carrier scheduling may be used to support the activation/de-activation from the macro cell. Due to backhaul delay, this may require the prescheduling between the macro cell and the small cell. SPS de-activation is normally transmitted without any SPS data so that there is less issue for the de-activation. However, for both the SPS activation/de-activation, the relevant PDCCH content may need to include the carrier index and/or the SPS service index if there are multiple SPS services. Currently, a number of fields are reserved in the PDCCH content for the SPS activation/de-activation. Some reserve fields may be used to indicate this information.

For RRC signaling of SPS configurations, such signaling may be suitable to be transmitted from the macro cell. In one embodiment, when the UE is switching from one small cell to another small cell, SPS configuration may remain unchanged. This may reduce the risk of service interruption due to small cell switching, which may degrade the user experience. Therefore, if the SPS configuration signaling is transmitted from the macro cell on the RRC level, no further signaling may be needed, even though the UE is moving from one small cell to another small cell.

The macro cell may signal the SPS configurations to the small cell through backhaul signaling and coordinate SPS resources. Only when the UE moves out of the coverage of the macro cell it is handed over to another macro cell as the SPS configuration invalid on the new macro cell.

When the UE is moving from one small cell to another small cell, the macro cell controls the switching. Current small cells may send de-activation signaling while a new small cell may send activation signaling to continue the voice service. The activation signaling could be sent earlier than the de-activation signaling, thus reducing the service interruption. The macro cells may prepare the SPS bearers through backhaul signaling and may notify the new bearers to the UE. In this case, the SPS configurations may remain unchanged, such configurations including periodicity, reserved hybrid acknowledgement repeat request (HARQ) numbers, among others.

In another alternative, RRC signaling of the SPS is signaled through individual small cells. In this case, whenever the UE is moving from one small cell to another small cell, SPS configurations may need to be reconfigured in the new cell, similar to a handover procedure. Early preparation for SPS resources may be needed via coordination of the macro cell via the backhaul signaling. However, the macro cell may coordinate the resource allocation in order to reduce potential interference.

Bi-Casting Solution

In a further embodiment, bi-casting may be used under the control of the macro cell. Specifically, when the user is moving from one small cell to another small cell, the macro cell may instruct the current small cell to maintain the downlink/uplink SPS bearers and the SPS transmission/reception for a certain time. The UE may or may not use the current small cell for the SPS transmission/reception, but due to possible handover failure the bearers may be maintained. Such a scheme may reduce the possibility of service interruption.

Figure 10:
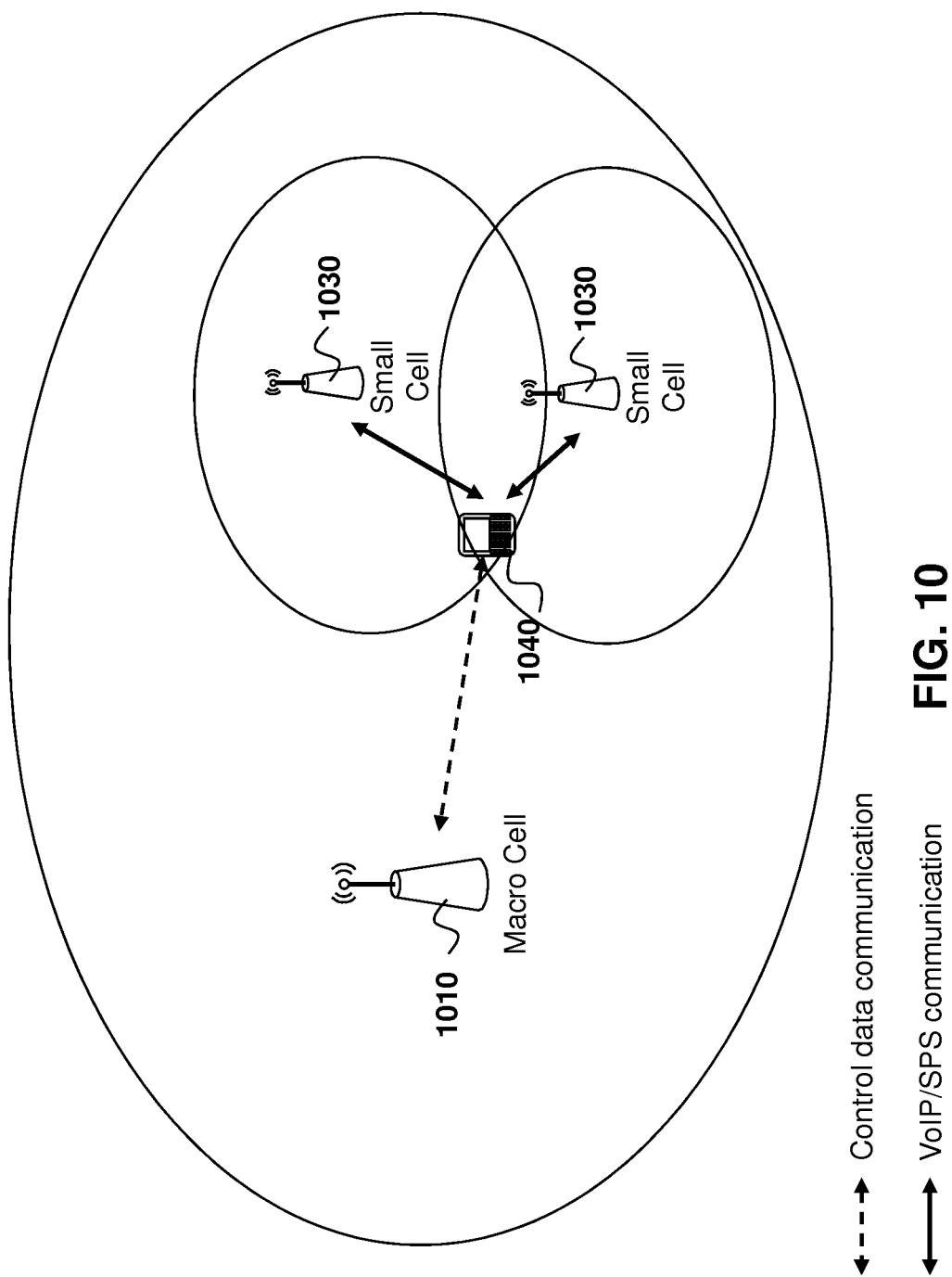
FIG. 10 is a block diagram showing bi-casting of a UE moving from a first small cell to a second small cell.

Reference is now made to FIG. 10 which shows an example of small cell bi-casting under the control of the macro serving cell. In particular, in FIG. 10 a macro cell 1010 communicates with small cells 1020 and 1030.

UE 1040 moves from small cell 1030 into small cell 1020. As the UE 1040 is moving into small cell 1020, macro cell 1010 continues to provide control data communication and further VoIP/SPS communication is maintained between small cell 1030 and UE 1040 in case of handover failure. Further, bearers are established between small cell 1020 and UE 1040. The macro cell coordinates the turning off or turning on of the SPS bearers and the resources for multiple small cells.

Non-CA Based Deployments

In a further embodiment, the macro cell and the small cell are on the same frequency and can interfere with each other. To avoid interference, in accordance with one embodiment of the present disclosure, in any downlink subframe, the UE receives data from only one of the macro cell or a small cell. The UE may not receive data from both the macro cell and the small cell at the same time.

Similarly, in any uplink subframe, the UE either transmits the data to the macro cell or to the small cell. The UE may not transmit the data to both the macro cell and to the small cell in the same UL subframe.

Assuming that range expansion is applied, for example in a pico cell scenario, ABS as described above may be used to mitigate the interference from the macro cell to the UEs connected to the small cells and located in the range expansion area.

To simplify transmission/reception in such a deployment scenario, synchronized transmission from the macro cell and the small cells may be assumed, which means the macro cell and the small cell are synchronized on the subframe level. If the macro serving cell only exchanges control plane data with the UE, in one embodiment only one or two HARQ processes may be allocated per UE in the downlink from the macro cell to the UE due to the infrequent data communication on the control plane. For each downlink HARQ process, there is an associated uplink HARQ process which, in frequency division duplex (FDD) may be 4 ms offset in one embodiment.

The remaining downlink HARQ processes may be allocated on the downlink from the small cell to the UE. The macro cell may need to determine the subframe offset between the macro cell and the small cell in order to align the HARQ process mappings.

In one alternative embodiment, the small cell may send its subframe timing information to the macro cell. For example, this may be accomplished using a backhaul between the macro cell and the small cell.

The macro cell may allocate the HARQ process on both the downlink from the macro cell to the UE, termed Macro-HARQ, and the downlink from the small cell to the UE (termed Small-HARQ).

In the range expansion area, the UE may observe strong interference from the macro cell during the allocated Small- HARQ and, when close to the small cell center, the UE may observe strong interference from the small cell during the allocated Macro-HARQ. To simplify the operations at the UE, the allocated Small-HARQ for all UEs will be the same or may be selected from a Common Small HARQ Set (CSHS), and the allocated Macro-HARQ for all UEs may be the same or selected from a Common Macro HARQ Set (CMHS). In one embodiment, the CSHS and the CMHS do not overlap.

In accordance with one embodiment of the present disclosure, the macro cell cannot transmit or transmits in low power during the CSHS while the small cell cannot transmit or transmits in low power during CMHS.

For each downlink HARQ process, there is an associated uplink HARQ process in FDD. Since CSHS and CMHS do not overlap, their associated uplink HARQ processes also do not overlap. Therefore, when a UE is allocated an HARQ process from the CMHS, on the downlink, the UE will not observe the interference from the small cell even though the UE is close to the small cell center. On the uplink, the UE does not generate uplink interference to other users in the small cell (small cell receiver side).

Similarly, when a UE is allocated an HARQ process from the CSHS on the downlink, the UE will not observe interference even though the UE is in the range expansion area. On the uplink, the UE does not generate uplink interference to other users in the macro cell.

Figure 11:
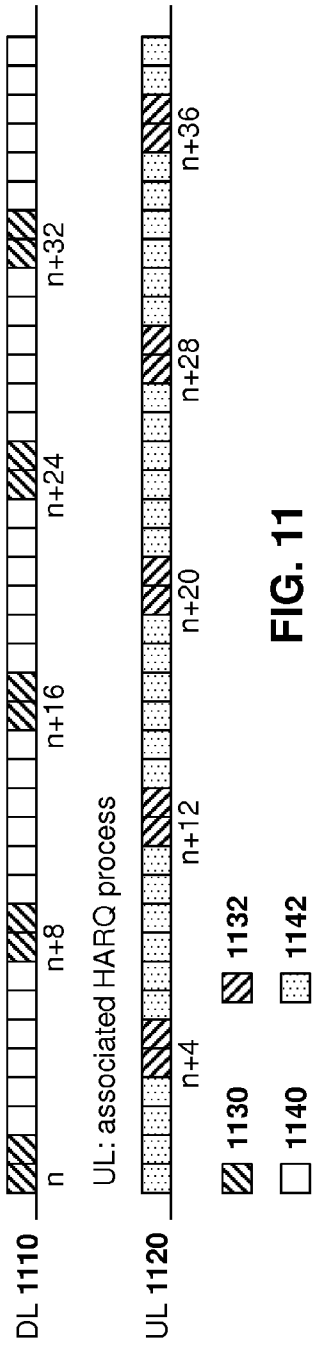
FIG. 11 is a block diagram showing uplink and downlink subframe divisions between a macro cell and a small cell.

Reference is now made to FIG. 11, which shows an example of CSHS, CMHS and associated uplink HARQ processes.

Assuming that the macro cell and small cell are synchronized on both the subframe level and the radio frame level, FIG. 11 shows a downlink process 1110 and an uplink process 1120.

In the example of FIG. 11, two subframes are allocated for the macro cell in the downlink process 1110, as shown by reference numeral 1130. These subframes are the downlink CMHS. Further, two subframes for the macro cell are allocated in associated uplink process 1120, as shown by reference numeral 1132. These subframes are the uplink HARQ process associated with CMHS.

Similarly, six downlink subframes, shown by reference numeral 1140 are provided for the small cell in the downlink subframes 1110. These are the downlink CSHS. Six associated uplink subframes for the small cell are provided in the uplink subframes 1120, as shown by reference numeral 1142. These are the uplink HARQ processes associated with CSHS.

Based on the above, in the example of FIG. 11 the macro subframes in the downlink are separate from the small cell subframes in the downlink. Similarly, the macro subframes in the uplink are separate from the small cell subframes in the uplink.

In the case that the macro cell and small cell are only synchronized on the subframe level, the subframe offset may be used to align the HARQ process mapping. In that case, the CSHS and the CMHS may contain the same HARQ process numbers; however, the absolute timing may be different. In other words, the absolute time of any HARQ process in the CSHS will be different from the absolute time of any HARQ process in the CMHS.

When the UE is connected to both the macro cell and the small cell, for example in different subframes, the macro cell will allocate one or more HARQ processes to the UE from the CSHS and one or more HARQ processes from the CMHS. During the allocated CSHS HARQ process, the UE will exchange the data with the small cell, while during the allocated CMHS HARQ process, the UE will exchange the data with the macro cell.

Figure 12:
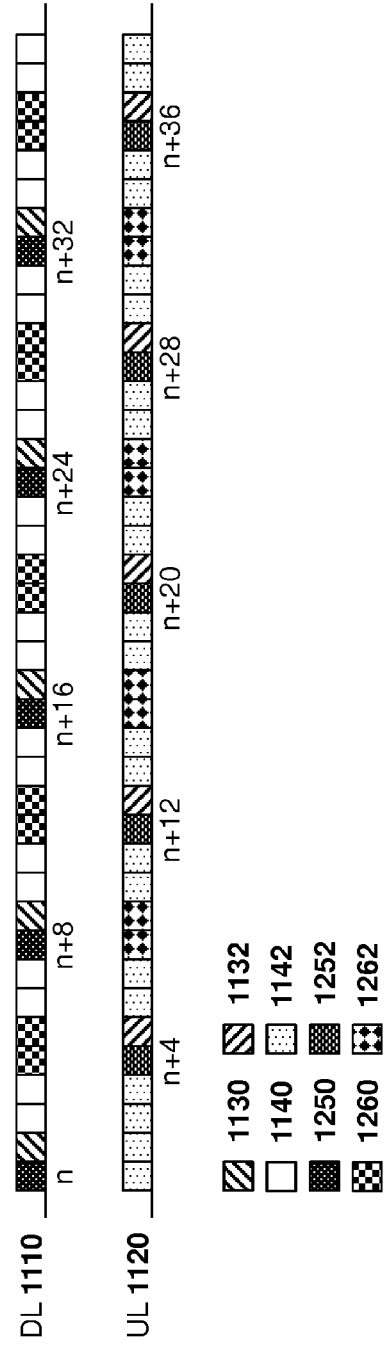
FIG. 12 is a block diagram showing user equipment allocations for a small cell and a macro cell.

Reference is now made to FIG. 12. FIG. 12 shows the example of FIG. 11 in which certain subframes have been allocated for the particular UE for an HARQ process. Unallocated subframes (or subframes allocated to different UEs) are shown with reference numerals 1130, 1132, 1140 and 1142, as described above.

As seen in FIG. 12, reference numerals 1250 show downlink allocated HARQ processes from the CMHS between the macro cell and an UE. The associated uplink process is shown with reference numeral 1252.

Similarly, downlink allocated HARQ processes from the CSHS between the small cell and the UE are shown with reference numeral 1260 and the associated uplink processes are shown with reference 1262.

In one embodiment, DRX configurations could be applied on top of the HARQ process allocation for better UE power savings. Different DRX configurations may exist for the macro cell and the small cell. During the active time of the macro cell, the UE may only monitor the PDCCH from the macro cell during the allocated CMHS HARQ process. Similarly, during the active time of the small cell, the UE may monitor the PDCCH from the small cell during the allocated CSHS HARQ process.

Further, the present embodiment would also support the SPS/VoIP services described above. The mobility-based solution and the bi-casting solution could equally be applied in the present embodiment.

In a further alternative, SPS/VoIP services may always be delivered by the macro cell rather than the small cell.

Further, with reference to interference between small cells when there are many small cells, the CSHS may be divided into multiple smaller non-overlapping subsets. Each subset is given to a small cell while no neighboring small cells have the same subset. In this way, the transmission/reception interference may be avoided. When two small cells are far enough apart, they may be assigned the same subset. Assignments of subsets may be controlled by the macro cell and more dynamic adaptation may be utilized to further improve performance.

The above may further be adapted to be used with time division duplex (TDD) systems. For example, certain downlink subframes in the TDD may be allocated for the CMHS HARQ process while other downlink TDD subframes may be allocated for the CSHS HARQ processes in one example. Due to the flexible DL/UL subframe configurations in TDD, some tables may be pre-defined or pre-set in the TDD in order to align the DL HARQ process and associated UL HARQ process. Other examples are possible.

The macro cells and small cells or assisted serving cells may be implemented using any network element. A simplified network element is shown with regard to FIG. 13.

Figure 13:
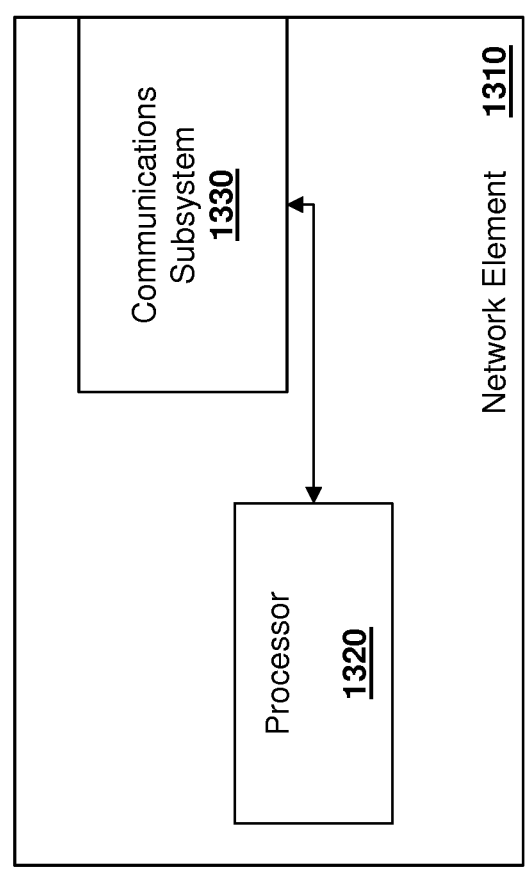
FIG. 13 is a simplified block diagram of an example network element.

In FIG. 13, network element 1310 includes a processor 1320 and a communications subsystem 1330, where the processor 1320 and communications subsystem 1330 cooperate to perform the methods described above.

Further, the above may be implemented by any UE. One exemplary device is described below with regard to FIG. 14.

UE 1400 is typically a two-way wireless communication device having voice and data communication capabilities. UE 1400 generally has the capability to communicate with other computer systems. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 1400 is enabled for two-way communication, it may incorporate a communication subsystem 1411, including both a receiver 1412 and a transmitter 1414, as well as associated components such as one or more antenna elements 1416 and 1418, local oscillators (LOs) 1413, and a processing module such as a digital signal processor (DSP) 1420. As will be apparent to those skilled in the field of communications, the particular design of the communication subsystem 1411 will be dependent upon the communication network in which the device is intended to operate. The radio frequency front end of communication subsystem 1411 can be any of the embodiments described above.

Network access requirements will also vary depending upon the type of network 1419. In some networks network access is associated with a subscriber or user of UE 1400. A UE may require a removable user identity module (RUIM) or a subscriber identity module (SIM) card in order to operate on a network. The SIM/RUIM interface 1444 is normally similar to a card-slot into which a SIM/RUIM card can be inserted and ejected. The SIM/RUIM card can have memory and hold many key configurations 1451, and other information 1453 such as identification, and subscriber related information.

Figure 14:
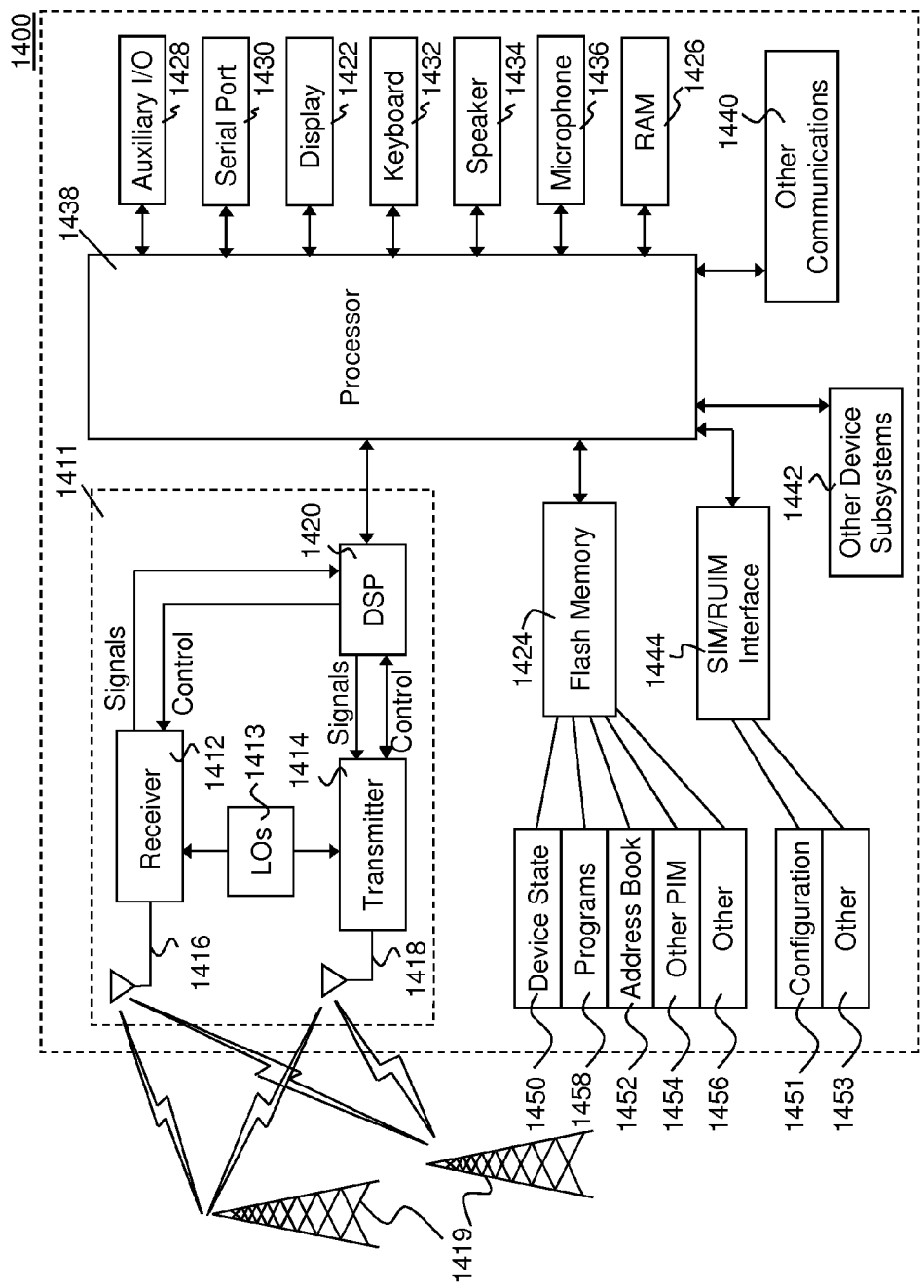
FIG. 14 is a block diagram of an example user equipment.

When required network registration or activation procedures have been completed, UE 1400 may send and receive communication signals over the network 1419. As illustrated in FIG. 14, network 1419 can consist of multiple base stations communicating with the UE. These can include base stations for macro cells and assisted serving cells or small cells in accordance with the embodiments described above.

Signals received by antenna 1416 through communication network 1419 are input to receiver 1412, which may perform such common receiver functions as signal amplification, frequency down conversion, filtering, channel selection and the like. A/D conversion of a received signal allows more complex communication functions such as demodulation and decoding to be performed in the DSP 1420. In a similar manner, signals to be transmitted are processed, including modulation and encoding for example, by DSP 1420 and input to transmitter 1414 for digital to analog conversion, frequency up conversion, filtering, amplification and transmission over the communication network 1419 via antenna 1418. DSP 1420 not only processes communication signals, but also provides for receiver and transmitter control. For example, the gains applied to communication signals in receiver 1412 and transmitter 1414 may be adaptively controlled through automatic gain control algorithms implemented in DSP 1420.

UE 1400 generally includes a processor 1438 which controls the overall operation of the device. Communication functions, including data and voice communications, are performed through communication subsystem 1411. Processor 1438 also interacts with further device subsystems such as the display 1422, flash memory 1424, random access memory (RAM) 1426, auxiliary input/output (I/O) subsystems 1428, serial port 1430, one or more keyboards or keypads 1432, speaker 1434, microphone 1436, other communication subsystem 1440 such as a short-range communications subsystem and any other device subsystems generally designated as 1442. Serial port 1430 could include a USB port or other port known to those in the art.

Some of the subsystems shown in FIG. 14 perform communication-related functions, whereas other subsystems may provide "resident" or on-device functions. Notably, some subsystems, such as keyboard 1432 and display 1422, for example, may be used for both communication-related functions, such as entering a text message for transmission over a communication network, and device-resident functions such as a calculator or task list.

Operating system software used by the processor 1438 may be stored in a persistent store such as flash memory 1424, which may instead be a read-only memory (ROM) or similar storage element (not shown). Those skilled in the art will appreciate that the operating system, specific device applications, or parts thereof, may be temporarily loaded into a volatile memory such as RAM 1426. Received communication signals may also be stored in RAM 1426.

As shown, flash memory 1424 can be segregated into different areas for both computer programs 1458 and program data storage 1450, 1452, 1454 and 1456. These different storage types indicate that each program can allocate a portion of flash memory 1424 for their own data storage requirements. Processor 1438, in addition to its operating system functions, may enable execution of software applications on the UE. A predetermined set of applications that control basic operations, including at least data and voice communication applications for example, will normally be installed on UE 1400 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1419. Further applications may also be loaded onto the UE 1400 through the network 1419, an auxiliary I/O subsystem 1428, serial port 1430, short-range communications subsystem 1440 or any other suitable subsystem 1442, and installed by a user in the RAM 1426 or a non-volatile store (not shown) for execution by the processor 1438. Such flexibility in application installation increases the functionality of the device and may provide enhanced on-device functions, communication-related functions, or both. For example, secure communication applications may enable electronic commerce functions and other such financial transactions to be performed using the UE 1400.

In a data communication mode, a received signal such as a text message or web page download will be processed by the communication subsystem 1411 and input to the processor 1438, which may further process the received signal for output to the display 1422, or alternatively to an auxiliary I/O device 1428.

A user of UE 1400 may also compose data items such as email messages for example, using the keyboard 1432, which may be a complete alphanumeric keyboard or telephone-type keypad, among others, in conjunction with the display 1422 and possibly an auxiliary I/O device 1428. Such composed items may then be transmitted over a communication network through the communication subsystem 1411.

For voice communications, overall operation of UE 1400 is similar, except that received signals would typically be output to a speaker 1434 and signals for transmission would be generated by a microphone 1436. Alternative voice or audio I/O subsystems, such as a voice message recording subsystem, may also be implemented on UE 1400. Although voice or audio signal output is generally accomplished primarily through the speaker 1434, display 1422 may also be used to provide an indication of the identity of a calling party, the duration of a voice call, or other voice call related information for example.

Serial port 1430 in FIG. 14 would normally be implemented in a personal digital assistant (PDA)-type UE for which synchronization with a user's desktop computer (not shown) may be desirable, but is an optional device component. Such a port 1430 would enable a user to set preferences through an external device or software application and would extend the capabilities of UE 1400 by providing for information or software downloads to UE 1400 other than through a wireless communication network. The alternate download path may for example be used to load an encryption key onto the device through a direct and thus reliable and trusted connection to thereby enable secure device communication. As will be appreciated by those skilled in the art, serial port 1430 can further be used to connect the UE to a computer to act as a modem.

Other communications subsystems 1440, such as a short-range communications subsystem, is a further optional component which may provide for communication between UE 1400 and different systems or devices, which need not necessarily be similar devices. For example, the subsystem 1440 may include an infrared device and associated circuits and components or a Bluetooth™ communication module to provide for communication with similarly enabled systems and devices. Subsystem 1440 may further include non-cellular communications such as WiFi, WiMAX, or near field communications (NFC).

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a macro cell operating in a heterogeneous network having at least one small cell, the method comprising:
    determining a mobility state of a user equipment by comparing a mobility of the user equipment with a threshold;
    sending criteria to the user equipment, the criteria being used by the user equipment to determine when to provide a request to associate only with the macro cell;
    receiving the request from the user equipment to be associated with the macro cell only; and
    limiting the user equipment to associate only with the macro cell based on the determining and the receiving.

2. The method of claim 1, wherein the determining is based on a report from the user equipment.

3. The method of claim 2, wherein the report is part of the request to associate only with the macro cell.

4. The method of claim 1, wherein the determining is based on number of cells the user equipment has been handed over during a predetermined time window.

5. The method of claim 1, further comprising finding that a service is used at the user equipment based on a query of service information from a core network.

6. The method of claim 5, wherein the finding the service is to ascertain whether a service at the user equipment falls within a predefined list of services.

7. The method of claim 1, further comprising:
    allowing the user equipment to associate only with either the macro cell or small cell based on at least one of the determining and the receiving.

8. The method of claim 6, wherein the determining finds the mobility of the user equipment is lower than the threshold or the finding finds that no service falls within the predefined list of services.

9. The method of claim 7, further comprising transmitting radio resource control signalling for semi-persistent scheduling configuration for the small cell to the user equipment.

10. The method of claim 9, wherein the semi-persistent scheduling configuration remains unchanged when the user equipment switches from a first small cell to a second small cell.

11. The method of claim 10, further comprising signalling semi-persistent scheduling configuration to the second small cell using backhaul signaling.

12. The method of claim 11, further comprising preparing semi-persistent scheduling bearers at the second small cell and providing the bearers to the user equipment.

13. The method of claim 7, further comprising pre-scheduling semi-persistent scheduling activation and deactivation between the macro cell and a first small cell and a second small cell utilizing backhaul signaling between the macro cell and the first small cell and utilizing backhaul signaling between the macro cell and the second small cell.

14. A macro cell configured to operate in a heterogeneous network having at least one small cell, the macro cell comprising:
    a processor; and
    a communications subsystem,
    wherein the macro cell is configured to:
        determine a mobility state of a user equipment by comparing a mobility of the user equipment with a threshold;
        send criteria to the user equipment, the criteria being used by the user equipment to determine when to provide a request to associate only with the macro cell;
        receive the request from the user equipment to be associated with the macro cell only; and
        limit the user equipment to associate only with the macro cell based on the determining and the receiving.

15. The macro cell of claim 14, wherein the macro cell is configured to determine based on a report from the user equipment.

16. The macro cell of claim 15, wherein the report is part of the request to associate only with the macro cell.

17. The macro cell of claim 14, wherein the macro cell is configured to determine based on number of cells the user equipment has been handed over during a predetermined time window.

18. The macro cell of claim 14, wherein the macro cell is further configured to find that a service is used at the user equipment based on a query of service information from a core network.

19. The macro cell of claim 18, wherein the macro cell is configured to find the service to ascertain whether a service at the user equipment falls within a predefined list of services.

20. The macro cell of claim 14, wherein the macro cell is further configured to:
allow the user equipment to associate only with either the macro cell or small cell based on at least one of the determining and the receiving.

21. The macro cell of claim 19, wherein the macro cell is configured to determine by finding the mobility of the user equipment is lower than the threshold or configured to find by finding that no service falls within the predefined list of services.

22. The macro cell of claim 20, wherein the macro cell is further configured to transmit radio resource control signalling for semi-persistent scheduling configuration for the small cell to the user equipment.

23. The macro cell of claim 22, wherein the semi-persistent scheduling configuration remains unchanged when the user equipment switches from a first small cell to a second small cell.

24. The macro cell of claim 23, wherein the macro cell is further configured to signal semi-persistent scheduling configuration to the second small cell using backhaul signaling.

25. The macro cell of claim 24, wherein the macro cell is further configured to prepare semi-persistent scheduling bearers at the second small cell and provide the bearers to the user equipment.

26. The macro cell of claim 20, wherein the macro cell is further configured to pre-schedule semi-persistent scheduling activation and deactivation between the macro cell and a first small cell and a second small cell utilizing backhaul signaling between the macro cell and the first small cell and utilizing backhaul signaling between the macro cell and the second small cell.

27. A method at a macro cell operating in a heterogeneous network having a plurality of small cells, where a user equipment is moving from a first small cell to a second small cell, the method comprising:
instructing, from the macro cell, the first small cell to maintain uplink and downlink semi-persistent scheduling bearers for a predefined time,
wherein the predefined time overlaps with the second small cell attempting to establish uplink and downlink semi-persistent scheduling bearers with the user equipment.

28. A macro cell for operating in a heterogeneous network having a plurality of small cells, where a user equipment is moving from a first small cell to a second small cell, the macro cell comprising:
a processor; and
a communications subsystem,
wherein the macro cell is configured to:
instruct, the first small cell to maintain uplink and downlink semi-persistent scheduling bearers for a predefined time,
wherein the predefined time overlaps with the second small cell attempting to establish uplink and downlink semi-persistent scheduling bearers with the user equipment.

* * * * *